US010551568B2

(12) United States Patent
Yeoh et al.

(10) Patent No.: US 10,551,568 B2
(45) Date of Patent: Feb. 4, 2020

(54) EYEPIECE PROVIDING COLOR SEPARATION IN PLANAR WAVEGUIDES USING DICHROIC FILTERS

(71) Applicant: Magic Leap, Inc., Plantation, FL (US)

(72) Inventors: Ivan Li Chuen Yeoh, Tampa, FL (US); Lionel Ernest Edwin, Plantation, FL (US); Hui-Chuan Cheng, Cooper City, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/445,115

(22) Filed: Jun. 18, 2019

(65) Prior Publication Data
US 2019/0310421 A1 Oct. 10, 2019

Related U.S. Application Data

(62) Division of application No. 15/849,527, filed on Dec. 20, 2017, now Pat. No. 10,371,896.
(Continued)

(51) Int. Cl.
G02B 6/293 (2006.01)
G02B 27/44 (2006.01)
(Continued)

(52) U.S. Cl.
CPC ....... *G02B 6/29361* (2013.01); *G02B 6/0016* (2013.01); *G02B 27/0081* (2013.01);
(Continued)

(58) Field of Classification Search
CPC .............. G02B 6/29361; G02B 6/0016; G02B 27/4205; G02B 27/1086; G02B 27/4277;
(Continued)

(56) References Cited

U.S. PATENT DOCUMENTS 4,693,544 A * 9/1987 Yamasaki .......... G02B 6/29364
385/132
5,915,051 A * 6/1999 Damask ............. G02B 6/12007
385/14
(Continued)

FOREIGN PATENT DOCUMENTS

CN 102683803 A 9/2012
CN 104145208 A 11/2014
(Continued)

OTHER PUBLICATIONS

"Metamaterials", Center for Metamaterials and Integrated Plasmonics, Duke University, Available online at: http://metamaterials.duke.edu/research/metamaterials, May 11, 2015, 1 page.
(Continued)

Primary Examiner — Andrew Jordan
(74) Attorney, Agent, or Firm — Kilpatrick Townsend & Stockton LLP

(57) ABSTRACT

An eyepiece for projecting an image to an eye of a viewer includes a first planar waveguide positioned in a first lateral plane, a second planar waveguide positioned in a second lateral plane adjacent the first lateral plane, and a third planar waveguide positioned in a third lateral plane adjacent the second lateral plane. The first waveguide includes a first diffractive optical element (DOE) coupled thereto and disposed at a lateral position. The second waveguide includes a second DOE coupled thereto and disposed at the lateral position. The third waveguide includes a third DOE coupled thereto and disposed at the lateral position. The eyepiece further includes a first optical filter disposed between the first waveguide and the second waveguide at the lateral position, and a second optical filter positioned between the second waveguide and the third waveguide at the lateral position.

12 Claims, 14 Drawing Sheets

Related U.S. Application Data

(60) Provisional application No. 62/438,315, filed on Dec. 22, 2016.

(51) Int. Cl.
*F21V 8/00* (2006.01)
*G02B 27/00* (2006.01)
*G02B 27/42* (2006.01)
*G02B 27/10* (2006.01)
*G02B 5/18* (2006.01)

(52) U.S. Cl.
CPC ..... *G02B 27/1086* (2013.01); *G02B 27/4205* (2013.01); *G02B 27/4277* (2013.01); *G02B 27/44* (2013.01); *G02B 5/1814* (2013.01); *G02B 5/1876* (2013.01)

(58) Field of Classification Search
CPC .. G02B 27/0081; G02B 27/44; G02B 5/1876; G02B 5/1814
See application file for complete search history.

(56) References Cited

U.S. PATENT DOCUMENTS

| | | | | |
|---|---|---|---|---|
| 6,181,393 B1 * | 1/2001 | Enomoto | G02F 1/133377 | 349/79 |
| 6,210,012 B1 * | 4/2001 | Broer | G02B 6/005 | 362/23.16 |
| 6,334,960 B1 * | 1/2002 | Willson | B29C 43/003 | 216/2 |
| 6,542,671 B1 * | 4/2003 | Ma | G02B 6/12002 | 385/132 |
| 6,680,726 B2 * | 1/2004 | Gordon, II | G02F 1/167 | 345/107 |
| 6,690,845 B1 * | 2/2004 | Yoshimura | G02B 6/12002 | 257/E23.01 |
| 6,735,224 B2 * | 5/2004 | Murry | G02B 6/12007 | 372/20 |
| 6,842,170 B1 * | 1/2005 | Akins | G02F 1/133603 | 178/18.01 |
| 6,873,087 B1 * | 3/2005 | Choi | B82Y 10/00 | 310/323.17 |
| 6,900,881 B2 * | 5/2005 | Sreenivasan | B29C 35/0888 | 257/E21.024 |
| 7,023,466 B2 * | 4/2006 | Favalora | G02B 27/22 | 348/42 |
| 7,070,405 B2 * | 7/2006 | Sreenivasan | B29C 35/0888 | 425/174.4 |
| 7,098,572 B2 * | 8/2006 | Choi | B82Y 10/00 | 310/311 |
| 7,122,482 B2 * | 10/2006 | Xu | B29C 43/003 | 438/738 |
| 7,140,861 B2 * | 11/2006 | Watts | B29C 43/003 | 425/174.4 |
| 7,206,107 B2 * | 4/2007 | Levola | G02B 27/0081 | 359/15 |
| 7,511,771 B2 * | 3/2009 | Stern | G03B 21/10 | 348/744 |
| 7,519,096 B2 * | 4/2009 | Bouma | A61B 5/0059 | 372/102 |
| 7,714,504 B2 * | 5/2010 | Forrest | C09K 11/06 | 313/504 |
| 7,733,571 B1 * | 6/2010 | Li | G02B 27/01 | 359/262 |
| 7,902,560 B2 * | 3/2011 | Bierhuizen | F21K 9/00 | 257/81 |
| 7,929,816 B2 * | 4/2011 | Meir | G02B 6/0041 | 385/129 |
| 8,064,035 B2 * | 11/2011 | Escuti | G02B 5/1833 | 349/193 |
| 8,076,386 B2 * | 12/2011 | Xu | B82Y 10/00 | 522/1 |
| 8,233,204 B1 * | 7/2012 | Robbins | G02B 5/1828 | 345/7 |
| 8,264,623 B2 * | 9/2012 | Marrucci | G02F 1/0305 | 349/12 |
| 8,508,848 B2 * | 8/2013 | Saarikko | G02B 5/1814 | 359/567 |
| 8,757,812 B2 * | 6/2014 | Melville | A61B 1/0008 | 353/85 |
| 8,817,350 B1 * | 8/2014 | Robbins | G02B 5/1828 | 345/7 |
| 8,885,997 B2 * | 11/2014 | Nguyen | G02B 6/0076 | 385/37 |
| 8,903,207 B1 * | 12/2014 | Brown | G02B 27/0103 | 359/1 |
| 8,950,867 B2 * | 2/2015 | Macnamara | G03B 21/00 | 353/7 |
| 9,170,436 B2 * | 10/2015 | Gibson | G02B 6/0003 | |
| 9,215,293 B2 * | 12/2015 | Miller | H04L 67/38 | |
| 9,310,559 B2 * | 4/2016 | Macnamara | G02B 6/262 | |
| 9,341,846 B2 * | 5/2016 | Popovich | G02B 27/0176 | |
| 9,348,143 B2 * | 5/2016 | Gao | G02B 27/0172 | |
| D758,367 S * | 6/2016 | Natsume | D14/372 | |
| 9,366,577 B2 * | 6/2016 | Kallendrusch | G02B 6/29361 | |
| 9,417,452 B2 * | 8/2016 | Schowengerdt | G06F 3/012 | |
| 9,519,089 B1 * | 12/2016 | Brown | G02B 5/18 | |
| 9,664,905 B2 * | 5/2017 | Bohn | G02B 27/0172 | |
| 9,671,566 B2 * | 6/2017 | Abovitz | G02B 27/225 | |
| 9,759,616 B2 * | 9/2017 | Kallendrusch | G02B 6/29361 | |
| 9,791,700 B2 * | 10/2017 | Schowengerdt | G06T 13/40 | |
| 9,933,684 B2 * | 4/2018 | Brown | G02F 1/29 | |
| 10,025,093 B2 * | 7/2018 | Wall | G02B 3/0062 | |
| 10,156,681 B2 * | 12/2018 | Waldern | G02B 5/32 | |
| 10,371,896 B2 | 8/2019 | Yeoh et al. | | |
| 10,444,419 B2 * | 10/2019 | Bhargava | G02B 5/1866 | |
| 10,446,369 B1 * | 10/2019 | Phillips | H01J 37/3005 | |
| 2002/0097962 A1 * | 7/2002 | Yoshimura | G02B 6/10 | 385/50 |
| 2002/0126249 A1 * | 9/2002 | Liang | C09K 19/544 | 349/187 |
| 2002/0167638 A1 * | 11/2002 | Byun | G02F 1/1341 | 349/187 |
| 2002/0172237 A1 * | 11/2002 | Murry | G02B 6/12007 | 372/18 |
| 2003/0161573 A1 * | 8/2003 | Ishida | G02B 6/12002 | 385/14 |
| 2004/0007465 A1 * | 1/2004 | Goldberg | G01N 27/44704 | 204/452 |
| 2004/0022888 A1 * | 2/2004 | Sreenivasan | B29C 35/0888 | 425/174.4 |
| 2004/0120647 A1 * | 6/2004 | Sakata | G02B 27/1053 | 385/39 |
| 2004/0191429 A1 * | 9/2004 | Patrick | C09K 19/02 | 428/1.3 |
| 2005/0042391 A1 * | 2/2005 | Ryan | G02B 5/3016 | 428/1.1 |
| 2005/0072959 A1 * | 4/2005 | Moia | G02B 5/3016 | 252/299.01 |
| 2005/0232530 A1 * | 10/2005 | Kekas | G02F 1/133504 | 385/11 |
| 2006/0121358 A1 * | 6/2006 | Rich | B29C 35/0888 | 430/1 |
| 2006/0126179 A1 * | 6/2006 | Levola | G02B 27/0081 | 359/563 |
| 2006/0157443 A1 * | 7/2006 | Mei | C23F 4/00 | 216/41 |
| 2007/0031097 A1 * | 2/2007 | Heikenfeld | G02B 26/02 | 385/129 |
| 2008/0285125 A1 * | 11/2008 | Lee | G02B 6/08 | 359/449 |
| 2009/0181339 A1 * | 7/2009 | Liang | A61B 1/0638 | 433/29 |
| 2010/0060822 A1 * | 3/2010 | Sun | C09K 11/7734 | 349/71 |
| 2010/0118403 A1 * | 5/2010 | Laitinen | G02B 6/006 | 359/567 |
| 2010/0142570 A1 * | 6/2010 | Konttinen | G02F 1/3501 | 372/22 |

(56) References Cited

U.S. PATENT DOCUMENTS

| | | | |
|---|---|---|---|
| 2010/0207964 A1* | 8/2010 | Kimmel | G02B 6/0036 345/690 |
| 2011/0024950 A1* | 2/2011 | Kruglick | B82Y 10/00 264/496 |
| 2011/0049761 A1* | 3/2011 | Mataki | B82Y 10/00 264/293 |
| 2011/0242661 A1* | 10/2011 | Simmonds | G02B 6/0035 359/567 |
| 2012/0127062 A1* | 5/2012 | Bar-Zeev | G02B 3/14 345/6 |
| 2012/0206323 A1* | 8/2012 | Osterhout | G02B 27/0093 345/8 |
| 2012/0206485 A1* | 8/2012 | Osterhout | G02B 27/0093 345/633 |
| 2012/0218301 A1* | 8/2012 | Miller | G02B 27/017 345/633 |
| 2012/0327330 A1* | 12/2012 | Takahashi | G02B 5/0221 349/61 |
| 2013/0082922 A1* | 4/2013 | Miller | G06F 3/017 345/156 |
| 2013/0125027 A1* | 5/2013 | Abovitz | G06F 3/011 715/757 |
| 2013/0222384 A1* | 8/2013 | Futterer | G02B 5/32 345/426 |
| 2013/0235440 A1* | 9/2013 | Takeda | G02B 27/0176 359/197.1 |
| 2013/0242392 A1* | 9/2013 | Amirparviz | G02B 27/0172 359/485.05 |
| 2013/0314765 A1* | 11/2013 | Padilla | G01K 7/003 359/315 |
| 2014/0064655 A1* | 3/2014 | Nguyen | G02B 6/0076 385/11 |
| 2014/0071539 A1* | 3/2014 | Gao | G02B 27/0025 359/630 |
| 2014/0140653 A1* | 5/2014 | Brown | G02B 6/0033 385/10 |
| 2014/0140654 A1* | 5/2014 | Brown | G02F 1/29 385/10 |
| 2014/0177023 A1* | 6/2014 | Gao | H04N 5/2258 359/238 |
| 2014/0211322 A1* | 7/2014 | Bohn | G02B 27/0081 359/633 |
| 2014/0218468 A1* | 8/2014 | Gao | H04N 5/2258 348/36 |
| 2014/0233879 A1* | 8/2014 | Gibson | G02B 6/0003 385/4 |
| 2014/0267420 A1* | 9/2014 | Schowengerdt | G06F 3/012 345/633 |
| 2014/0306866 A1* | 10/2014 | Miller | G06T 19/006 345/8 |
| 2015/0002528 A1* | 1/2015 | Bohn | G02B 27/0172 345/589 |
| 2015/0015879 A1* | 1/2015 | Papadopoulos | G02B 23/26 356/301 |
| 2015/0016777 A1* | 1/2015 | Abovitz | G02B 27/225 385/37 |
| 2015/0062500 A1* | 3/2015 | Park | G02B 5/3058 349/96 |
| 2015/0103306 A1* | 4/2015 | Kaji | G02C 5/045 351/128 |
| 2015/0178939 A1* | 6/2015 | Bradski | G02B 27/017 345/633 |
| 2015/0205126 A1* | 7/2015 | Schowengerdt | G06T 13/40 345/633 |
| 2015/0222883 A1* | 8/2015 | Welch | G02B 27/2278 348/55 |
| 2015/0222884 A1* | 8/2015 | Cheng | H04N 13/395 348/55 |
| 2015/0268415 A1* | 9/2015 | Schowengerdt | G02B 6/08 385/4 |
| 2015/0302652 A1* | 10/2015 | Miller | G06F 3/011 345/419 |
| 2015/0346490 A1* | 12/2015 | Tekolste | G02B 27/0081 349/11 |
| 2015/0346495 A1* | 12/2015 | Welch | G02B 27/0172 345/8 |
| 2016/0011419 A1* | 1/2016 | Gao | G02B 27/0172 359/471 |
| 2016/0026253 A1* | 1/2016 | Bradski | G02B 27/225 345/8 |
| 2016/0033771 A1* | 2/2016 | Tremblay | G02B 26/10 345/8 |
| 2016/0041390 A1* | 2/2016 | Poon | G02B 3/04 345/8 |
| 2016/0077338 A1* | 3/2016 | Robbins | G02B 27/0172 345/8 |
| 2016/0097930 A1* | 4/2016 | Robbins | G02B 27/0172 345/8 |
| 2016/0116739 A1* | 4/2016 | TeKolste | G02B 27/0172 385/36 |
| 2016/0116979 A1* | 4/2016 | Border | G06F 3/013 345/156 |
| 2016/0209648 A1* | 7/2016 | Haddick | G02B 27/0093 |
| 2016/0231567 A1* | 8/2016 | Saarikko | G02B 27/0172 |
| 2016/0231568 A1* | 8/2016 | Saarikko | G02B 5/1861 |
| 2016/0270656 A1* | 9/2016 | Samec | A61B 3/085 |
| 2016/0291328 A1* | 10/2016 | Popovich | G02B 27/0176 |
| 2017/0010466 A1* | 1/2017 | Klug | G02B 27/0172 |
| 2017/0010488 A1* | 1/2017 | Klug | G02B 27/0172 |
| 2017/0097507 A1* | 4/2017 | Yeoh | G02B 6/0026 |
| 2017/0299860 A1* | 10/2017 | Wall | G02B 3/0062 |
| 2017/0322419 A1* | 11/2017 | TeKolste | G02B 27/0172 |
| 2018/0052320 A1 | 2/2018 | Curtis et al. | |
| 2018/0149873 A1* | 5/2018 | Edwin | G02B 6/0016 |
| 2018/0180817 A1* | 6/2018 | Yeoh | G02B 27/1086 |
| 2018/0231771 A1* | 8/2018 | Schuck, III | G02B 27/0018 |
| 2018/0373115 A1* | 12/2018 | Brown | G02F 1/29 |

FOREIGN PATENT DOCUMENTS

| | | |
|---|---|---|
| CN | 107111204 A | 8/2017 |
| EP | 3201686 A1 | 8/2017 |
| EP | 3308219 A1 | 4/2018 |
| EP | 3308220 A1 | 4/2018 |
| IL | 251433 | 5/2017 |
| KR | 1020170065609 | 6/2017 |
| KR | 1020180018766 | 2/2018 |
| KR | 1020180019181 | 2/2018 |
| WO | 2010067114 A1 | 6/2010 |
| WO | 2014091204 A1 | 6/2014 |
| WO | 2014172252 A1 | 10/2014 |
| WO | 2016054092 A1 | 4/2016 |
| WO | 2016205249 A1 | 12/2016 |
| WO | 2016205256 A1 | 12/2016 |
| WO | 2018119181 A1 | 6/2018 |

OTHER PUBLICATIONS

Escuti, et al., "Polarization-Independent Switching With High Contrast From A Liquid Crystal Polarization Grating", SID Symposium Digest, vol. 37, Jun. 2006, 6 pages.

Kim, et al., "Wide-Angle, Nonmechanical Beam Steering With High Throughput Utilizing Polarization Gratings", Applied Optics, vol. 50, No. 17, Jun. 2011, pp. 2636-2639.

Komanduri, et al., "34.4 L-Late-News Paper: Polarization Independent Projection Systems using Thin Film Polymer Polarization Gratings and Standard Liquid Crystal Microdisplays", In SID Symposium Digest of Technical Papers, Jun. 2009, 5 pages.

Komanduri, et al., "Elastic Continuum Analysis of the Liquid Crystal Polarization Grating", Physical Review E., May 25, 2007, 8 pages.

Komanduri, "Late News Paper: Polarization Independent Projection Systems using Thin Film Polymer Polarization Gratings and Standard Liquid Crystal Microdisplays", NC State University Slides, Presentation at SID-Display Week, Jun. 3, 2009, 4 pages.

Komanduri, "Polarization-Independent Modulation for Projection Displays Using Smallperiod Lc Polarization Gratings", J Soc Inform Display, vol. 15, No. 8, 2007, pp. 589-594.

(56) References Cited

OTHER PUBLICATIONS

Lim, et al., "Anisotropic Nano-Imprinting Technique for Fabricating a Patterned Optical Film of a Liquid Cyrstalline Polymer", J Nanosci Nanotechnol., vol. 8, 2008, pp. 4775-4778.
Nikolova, et al., "Diffraction Efficiency and Selectivity of Polarization Holographic Recording", Optica Acta: Int'l J Optics, vol. 31, No. 5, 1984, pp. 579-588.
Oh, et al., "Achromatic Diffraction from Polarization Gratings with High Efficiency", Opt Lett., vol. 33, No. 20 and Erratum Opt Lett., vol. 34, No. 23, 3637, Oct. 2008, pp. 2287-2289.
Oh, et al., "Numerical Analysis of Polarization Gratings Using the Finite-Difference Time-Domain Method", Physical Review A, vol. 76, Oct. 2007, pp. 043815-1 to 043815-8.
Oh, et al., "Polarization-Independent Modulation Using Standard Liquid Crystal Microdisplays and Polymer Polarization Gratings", NC State University, International Display Research Conference, vol. 28, 2008, pp. 298-301.
Yu, et al., "Flat Optics with Designer Metasurfaces", Nature Materials, vol. 13, Feb. 2014, pp. 139-150.

\* cited by examiner

Without filters      With filters
FIG. 6A 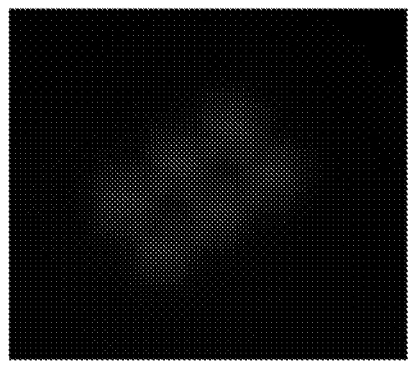 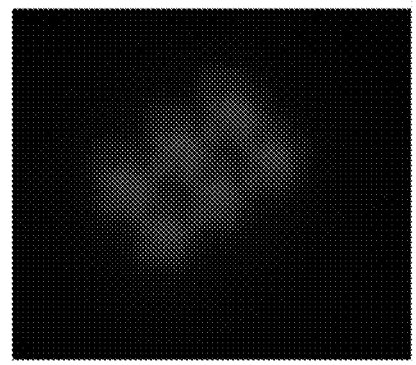 FIG. 6E
FIG. 6B  FIG. 6F
FIG. 6C 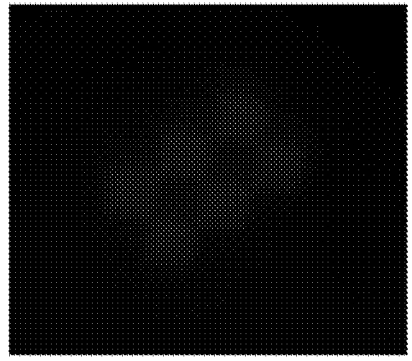 FIG. 6G
FIG. 6D 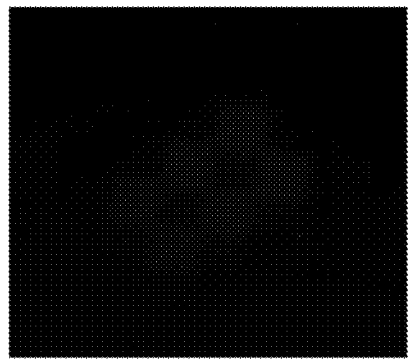 FIG. 6H

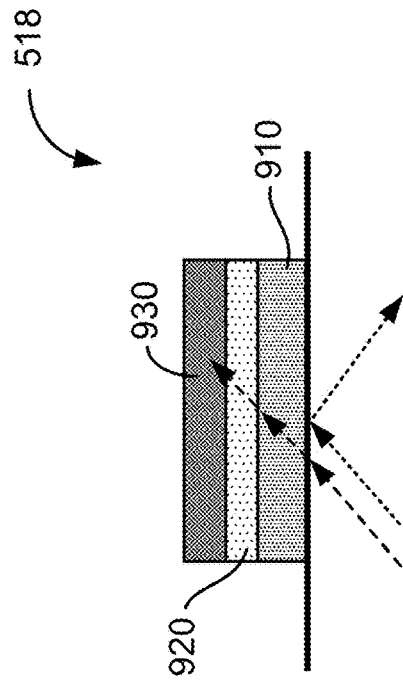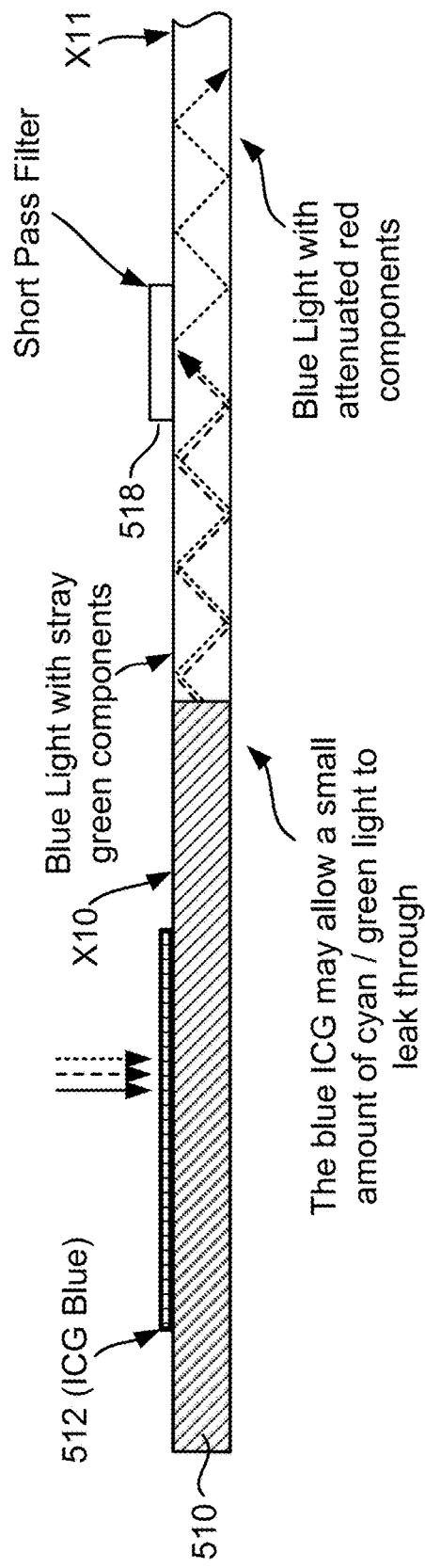
FIG. 9B
FIG. 9A

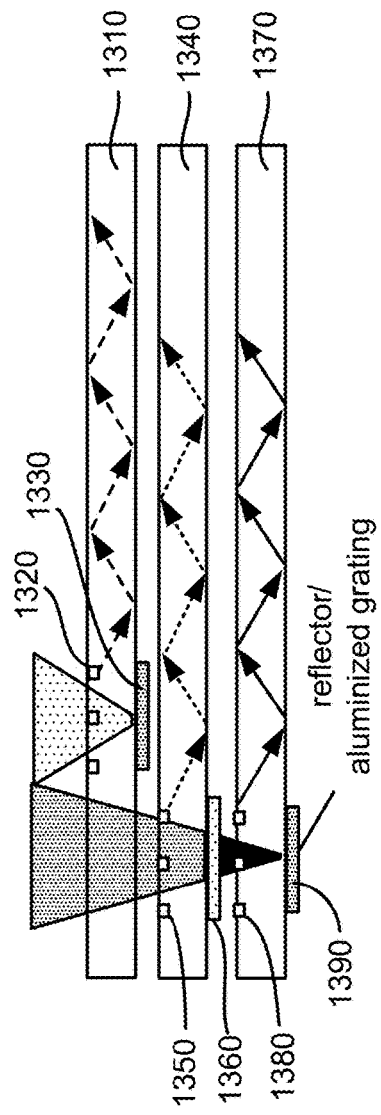
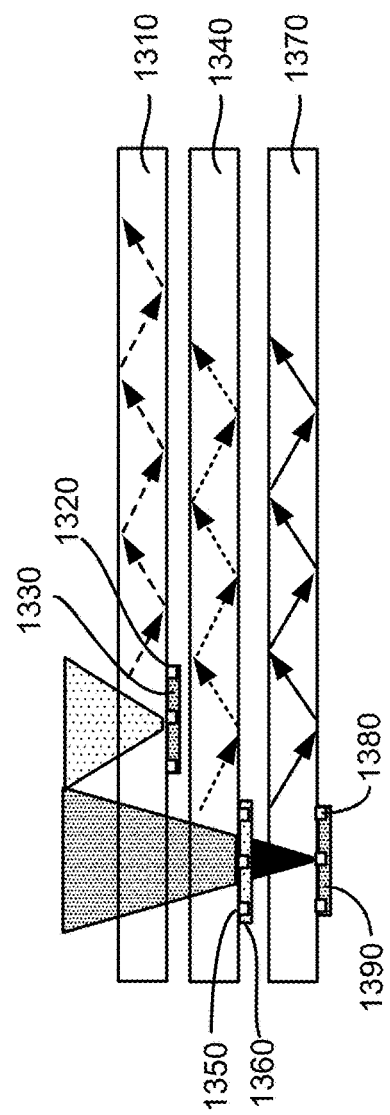
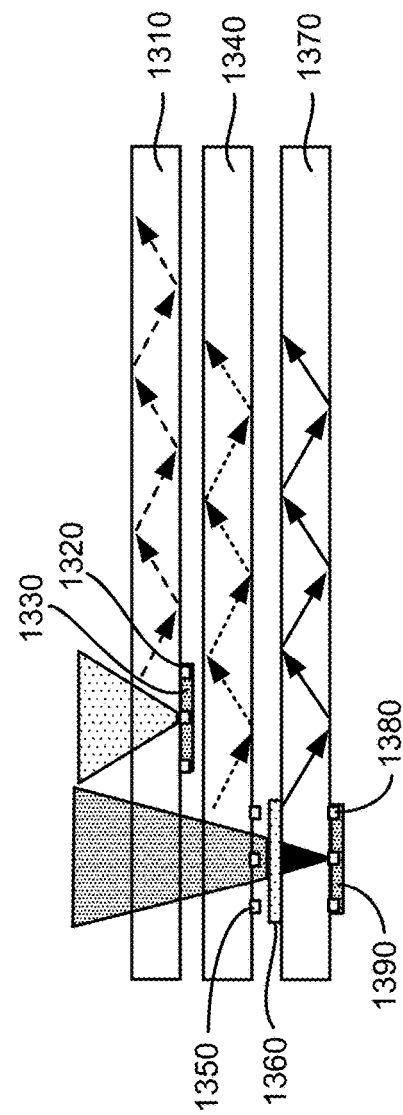
FIG. 13A
FIG. 13B
FIG. 13C

EYEPIECE PROVIDING COLOR SEPARATION IN PLANAR WAVEGUIDES USING DICHROIC FILTERS

CROSS-REFERENCES TO RELATED APPLICATIONS

This application is a divisional of U.S. patent application Ser. No. 15/849,527, filed on Dec. 20, 2017, now U.S. Pat. No. 10,371,896, issued on Aug. 6, 2019, entitled "COLOR SEPARATION IN PLANAR WAVEGUIDES USING DICHROIC FILTERS," which claims priority of U.S. Provisional Patent Application No. 62/438,315, filed on Dec. 22, 2016, entitled "COLOR SEPARATION IN WAVEGUIDES USING DICHROIC FILTERS," the contents of which are incorporated by reference in their entireties.

BACKGROUND OF THE INVENTION

Modern computing and display technologies have facilitated the development of systems for so called "virtual reality" or "augmented reality" experiences, wherein digitally reproduced images or portions thereof are presented to a viewer in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the viewer.

Despite the progress made in these display technologies, there is a need in the art for improved methods and systems related to augmented reality systems.

SUMMARY OF THE INVENTION

According to an embodiment of the present invention, an eyepiece for projecting an image to an eye of a viewer includes a first planar waveguide positioned in a first lateral plane, a second planar waveguide positioned in a second lateral plane adjacent the first lateral plane, and a third planar waveguide positioned in a third lateral plane adjacent the second lateral plane. The first waveguide includes a first diffractive optical element (DOE) coupled thereto and disposed at a lateral position. The first DOE is configured to diffract image light in a first wavelength range centered at a first wavelength. The second waveguide includes a second DOE coupled thereto and disposed at the lateral position. The second DOE is configured to diffract image light in a second wavelength range centered at a second wavelength longer than the first wavelength. The third waveguide includes a third DOE coupled thereto and disposed at the lateral position. The third DOE configured to diffract image light in a third wavelength range centered at a third wavelength longer than the second wavelength. The eyepiece further includes a first optical filter disposed between the first waveguide and the second waveguide at the lateral position, and a second optical filter positioned between the second waveguide and the third waveguide at the lateral position. The first optical filter is configured to have a first transmittance value at the first wavelength range, a second transmittance value at the second wavelength range and the third wavelength range that is greater than the first transmittance value, and a first reflectance value at the first wavelength range that is greater than about 90%. The second optical filter is configured to have a third transmittance value at the first wavelength range and the second wavelength range, a fourth transmittance value at the third wavelength range that is greater than the third transmittance value, and a second reflectance value at the second wavelength range that is greater than about 90%. In some examples, each of the first transmittance value and the third transmittance value may be less than about 10%; and each of the second transmittance value and the fourth transmittance value may be greater than about 90%. In some other examples, each of the first transmittance value and the third transmittance value may be less than about 20%; and each of the second transmittance value and the fourth transmittance value may be greater than about 80%. In some examples, the first optical filter may be configured to have the first transmittance value and the second transmittance value for angles of incidence ranging from about zero degree to about 45 degrees; and the second optical filter may be configured to have the third transmittance value and the fourth transmittance value for angles of incidence ranging from about zero degree to about 45 degrees. In some other examples, the first optical filter may be configured to have the first transmittance value and the second transmittance value for angles of incidence ranging from about zero degree to about 25 degrees; and the second optical filter may be configured to have the third transmittance value and the fourth transmittance value for angles of incidence ranging from about zero degree to about 25 degrees.

According to another embodiment of the present invention, an eyepiece for projecting an image to an eye of a viewer includes a first planar waveguide positioned in a first lateral plane. The first waveguide has a first lateral region and a second lateral region. The first lateral region is disposed at a lateral position and configured to receive image light incident on a first lateral surface thereof. The image light includes image light in a first wavelength range centered at a first wavelength, image light in a second wavelength range centered at a second wavelength longer than the first wavelength, and image light in a third wavelength range centered at a third wavelength longer than the second wavelength. The eyepiece further includes a first diffractive optical element (DOE) optically coupled to the first lateral region of the first waveguide and configured to diffract image light in the first wavelength range into the first waveguide to be guided toward the second lateral region of the first waveguide. A first portion of the image light is transmitted through the first waveguide. The eyepiece further includes a first optical filter positioned in a second lateral plane adjacent the first lateral plane at the lateral position and configured to receive the first portion of the image light. The first optical filter is further configured to have a first transmittance value for the first wavelength range and a second transmittance value for the second wavelength range and the third wavelength range that is greater than the first transmittance value. The eyepiece further includes a second planar waveguide positioned in a third lateral plane adjacent the second lateral plane. The second waveguide has a first lateral region and a second lateral region. The first region is disposed at the lateral position and configured to receive image light transmitted through the first optical filter and incident at a first lateral surface thereof. The eyepiece further includes a second DOE optically coupled to the first lateral region of the second waveguide and configured to diffract image light in the second wavelength range into the second waveguide to be guided toward the second lateral region of the second waveguide. A second portion of the image light is transmitted through the second waveguide. The eyepiece further includes a second optical filter positioned in a fourth lateral plane adjacent the third lateral plane at the lateral position and configured to receive the second portion of the image light. The second optical filter is configured to have a third transmittance value for the first wavelength range and the second wavelength range and a fourth transmittance value for the third wavelength range that is greater than the third transmittance value. The eyepiece further includes a third planar waveguide positioned at a fifth lateral plane adjacent the fourth lateral plane. The third waveguide has a first lateral region and a second lateral region. The first lateral region is disposed at the lateral position and configured to receive image light transmitted through the second optical filter and incident at a first lateral surface thereof. The eyepiece further includes a third DOE optically coupled to the first lateral region of the third waveguide and configured to diffract image light in the third wavelength range into the third waveguide to be guided toward the second lateral region of the third waveguide.

According to yet another embodiment of the present invention, an eyepiece for projecting image light to an eye of a viewer includes a first planar waveguide. The first waveguide includes a first diffractive optical element (DOE) optically coupled thereto. The first DOE is positioned along an optical path of the image light and configured to couple a portion of the image light in a first wavelength range centered at a first wavelength into the first planar waveguide to be propagated in the first planar waveguide. The eyepiece further includes a first optical filter positioned along the optical path downstream from the first DOE. The first optical filter is configured to attenuate the image light in the first wavelength range incident thereon. The eyepiece further includes a second planar waveguide. The second waveguide includes a second DOE optically coupled thereto. The second DOE is positioned along the optical path downstream from the first optical filter and configured to couple a portion of the image light in a second wavelength range centered at a second wavelength different from the first wavelength into the second planar waveguide to be propagated in the second planar waveguide. The eyepiece further includes a second optical filter coupled to the first planar waveguide. The second optical filter is configured to absorb image light in the second wavelength range propagating in the first planar waveguide.

According to a further embodiment of the present invention, an eyepiece for projecting an image to an eye of a viewer includes a first planar waveguide positioned in a first lateral plane, a second planar waveguide positioned in a second lateral plane adjacent the first lateral plane, and a third planar waveguide positioned in a third lateral plane adjacent the second lateral plane. The first waveguide includes a first diffractive optical element (DOE) coupled thereto and disposed at a first lateral position. The second waveguide includes a second DOE coupled thereto and disposed at a second lateral position. The third waveguide includes a third DOE coupled thereto and disposed at the second lateral position. The eyepiece further includes an optical filter positioned between the second waveguide and the third waveguide at the second lateral position.

According to some other embodiments of the present invention, an eyepiece for projecting an image to an eye of a viewer includes a first planar waveguide positioned in a first lateral plane. The first waveguide includes a first incoupling element optically coupled thereto. The first incoupling element is configured to diffract image light in a first wavelength range centered at a first wavelength. The eyepiece further includes a second planar waveguide positioned in a second lateral plane adjacent the first lateral plane. The second waveguide includes a second incoupling element optically coupled thereto. The second incoupling element is configured to diffract image light in a second wavelength range centered at a second wavelength different from the first wavelength. The eyepiece further includes a first optical element positioned between the first waveguide and the second waveguide in lateral alignment with the first incoupling element. The first optical element is configured to reflect image light in the first wavelength range.

BRIEF DESCRIPTION OF THE DRAWINGS

FIG. 6A-6D illustrate some example images formed by an eyepiece without filters according to an embodiment of the present invention.

FIG. 6E-6H illustrate some example images formed by an eyepiece with dichroic filters according to an embodiment of the present invention.

FIG. 9A illustrates schematically a partial cross-sectional view of a waveguide including a short-pass filter coupled thereto according to an embodiment of the present invention.

FIG. 9B illustrates schematically a cross-sectional view of a short-pass filter according to an embodiment of the present invention.

FIGS. 13A-13C illustrate partial cross-sectional views of eyepieces according to various embodiments of the present invention.

DETAILED DESCRIPTION OF SPECIFIC EMBODIMENTS

The present disclosure relates generally to eyepieces that may be used for virtual reality and augmented reality visualization systems. More particularly, the present invention relates to an eyepiece that includes one or more long-pass dichroic filters for color separation between different waveguides. The eyepiece may also include one or more short-pass dichroic filters for further reducing wavelength cross-coupling. Such an eyepiece may afford a more compact form factor and enhanced brightness and contrast of the light fields, as well as reduced wavelength cross-coupling, as compared to conventional eyepieces.

Figure 1:
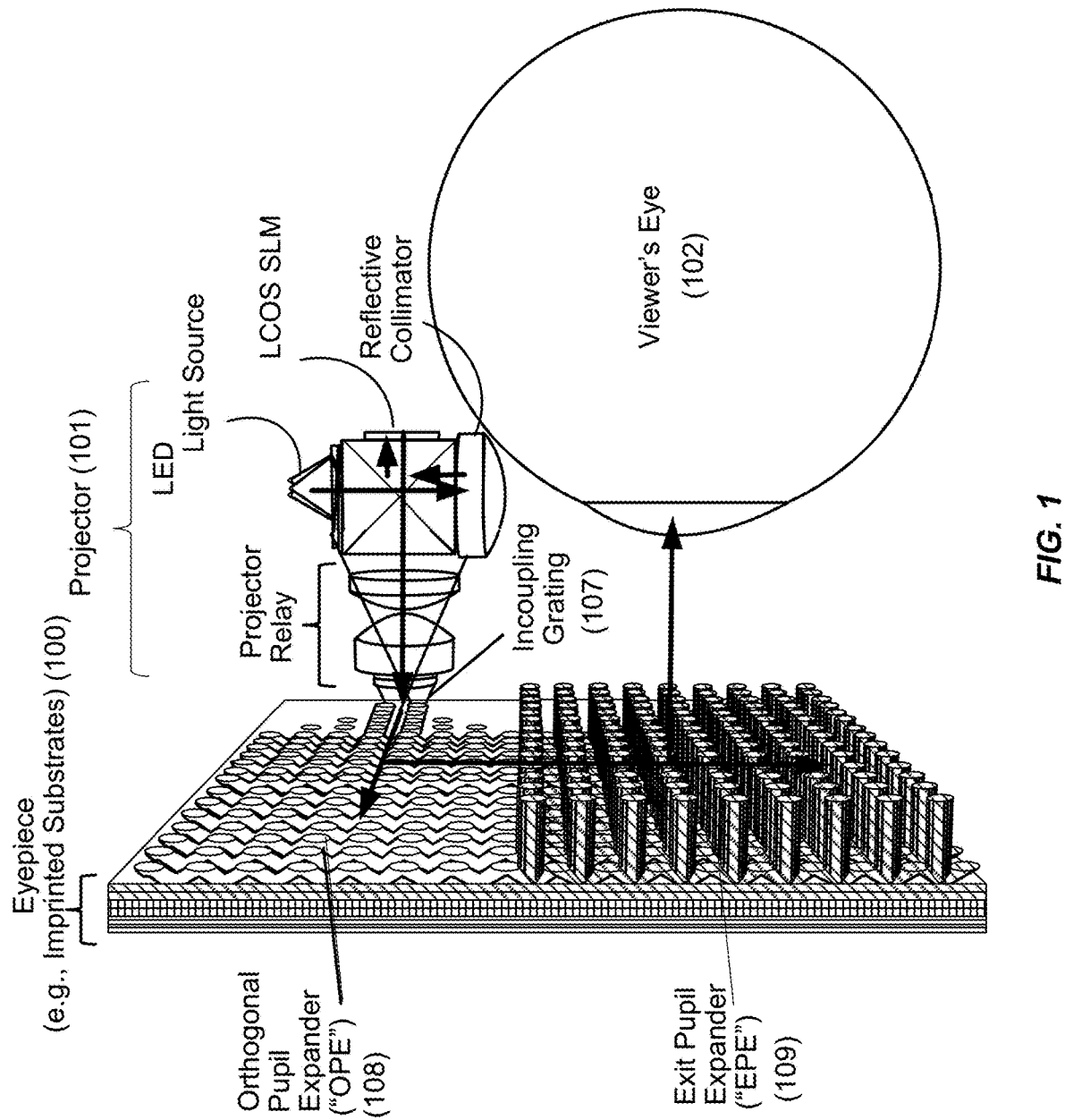
FIG. 1 illustrates schematically the light paths in a part of a viewing optics assembly (VOA) that may be used to present a digital or virtual image to a viewer, according to an embodiment of the present invention.

FIG. 1 illustrates schematically the light paths in a part of a viewing optics assembly (VOA) that may be used to present a digital or virtual image to a viewer, according to an embodiment of the present invention. The VOA includes a projector 101 and an eyepiece 100 that may be worn around a viewer's eye. In some embodiments, the projector 101 may include a group of red LEDs, a group of green LEDs, and a group of blue LEDs. For example, the projector 101 may include two red LEDs, two green LEDs, and two blue LEDs according to an embodiment. The eyepiece 100 may include one or more eyepiece layers. In one embodiment, the eyepiece 100 includes three eyepiece layers, one eyepiece layer for each of the three primary colors, red, green, and blue. In another embodiment, the eyepiece 100 may include six eyepiece layers, i.e., one set of eyepiece layers for each of the three primary colors configured for forming a virtual image at one depth plane, and another set of eyepiece layers for each of the three primary colors configured for forming a virtual image at another depth plane. In other embodiments, the eyepiece 100 may include three or more eyepiece layers for each of the three primary colors for three or more different depth planes. Each eyepiece layer includes a planar waveguide and may include an incoupling grating 107, an orthogonal pupil expander (OPE) region 108, and an exit pupil expander (EPE) region 109.

Still referring to FIG. 1, the projector 101 projects image light onto the incoupling grating 107 in an eyepiece layer 100. The incoupling grating 107 couples the image light from the projector 101 into the planar waveguide propagating in a direction toward the OPE region 108. The waveguide propagates the image light in the horizontal direction by total internal reflection (TIR). The OPE region 108 of the eyepiece layer 100 also includes a diffractive element that couples and redirects a portion of the image light propagating in the waveguide toward the EPE region 109. The EPE region 109 includes an diffractive element that couples and directs a portion of the image light propagating in the waveguide in a direction approximately perpendicular to the plane of the eyepiece layer 100 toward a viewer's eye 102. In this fashion, an image projected by projector 101 may be viewed by the viewer's eye 102. The part of the VOA illustrated in FIG. 1 may constitute a "monocle" for one eye of the viewer. The entire VOA may include two such monocles, one for each eye of the viewer.

Figure 2:
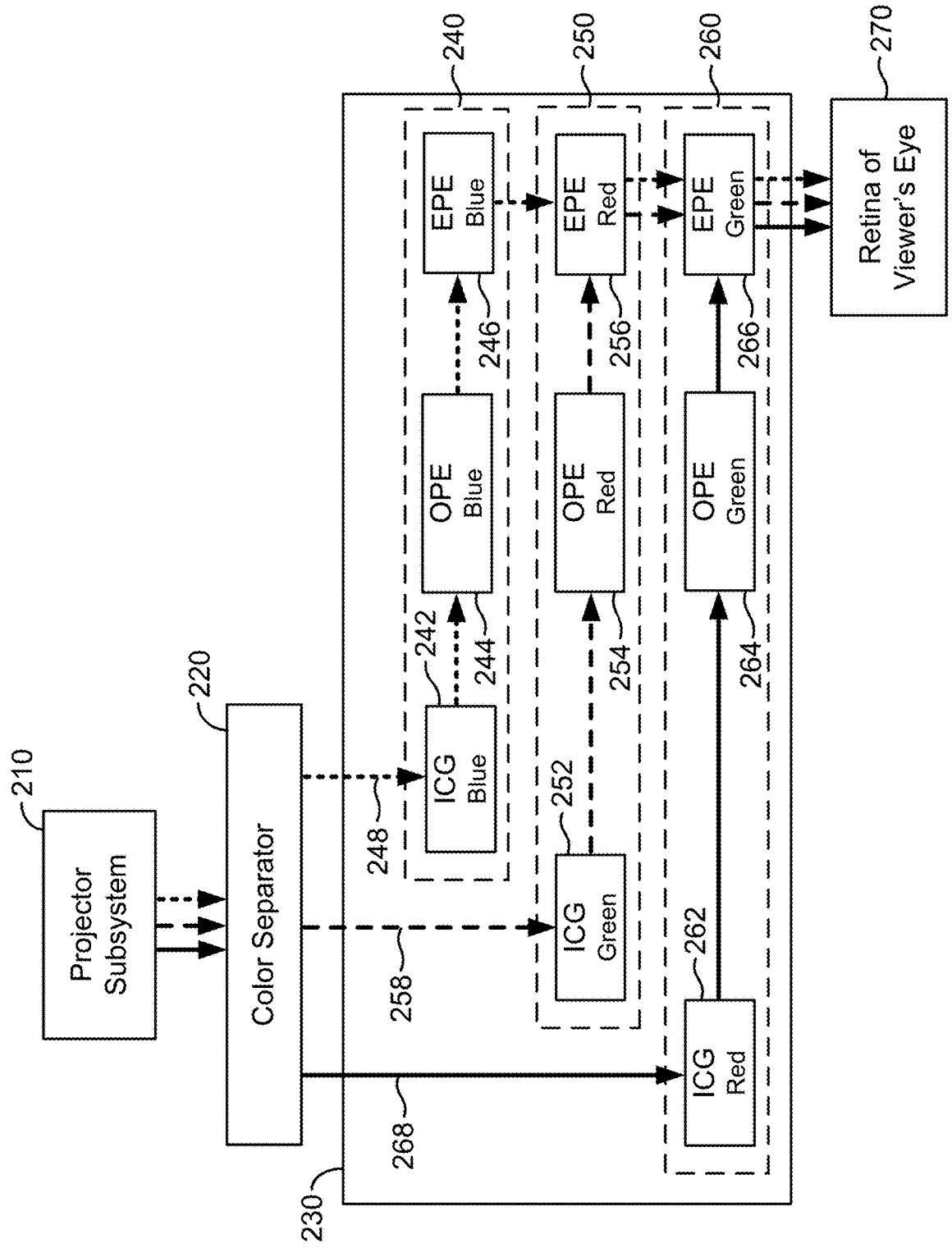
FIG. 2 illustrates schematically one method of color separation in an eyepiece for viewing a virtual image.

As described above, image light generated by the projector may include light in the three primary colors, namely blue (B), green (G), and red (R). Such image light will need to be separated into the constituent colors, so that image light in each constituent color may be coupled to a respective waveguide in the eyepiece. FIG. 2 illustrates schematically one method of color separation using a "split pupil" approach. In this example, an eyepiece 230 includes a blue waveguide 240, a green waveguide 250, and a red waveguide 260. Each waveguide 240, 250, or 260 may include an incoupling grating (ICG) 242, 252, or 262, an orthogonal pupil expander (OPE) region 244, 254, or 264, and an exit pupil expander (EPE) region 246, 256, or 266. The ICG, the OPE, and the EPE in each waveguide are designed for a particular wavelength range.

For example, the ICG 242 in the blue waveguide 240 may include a diffractive optical element (DOE) configured to diffract primarily blue light into the blue waveguide 240 to be guided toward the OPE region 244. The OPE region 244 of the blue waveguide 240 may include a DOE configured to diffract primarily blue light toward the EPE region 246. The EPE region 246 of the blue waveguide 240 may include a DOE configured to diffract primarily blue light toward the viewer's eye 270.

In the example illustrated in FIG. 2, a color separator 220 may separate the image light in blue, green, and red colors generated by the projector subsystem 210 into three spatially separate light paths: the blue light path 248, the green light path 258, and the red light path 268. The ICGs 242, 252, and 262 in the blue, green, and red waveguides 240, 250, and 260 may be laterally offset from each other, such that the ICG 242 for the blue waveguide 240 may be aligned with the blue light path 248, the ICG 252 for the green waveguide 250 may be aligned with the green light path 258, and the ICG 262 for the red waveguide 260 may be aligned with the red light path 268. The eyepiece 230 illustrated in FIG. 2 may have a relatively large form factor as the ICGs 242, 252, and 262 in the three waveguides 240, 250, and 260 need to be laterally displaced with respect to each other.

Figure 3:
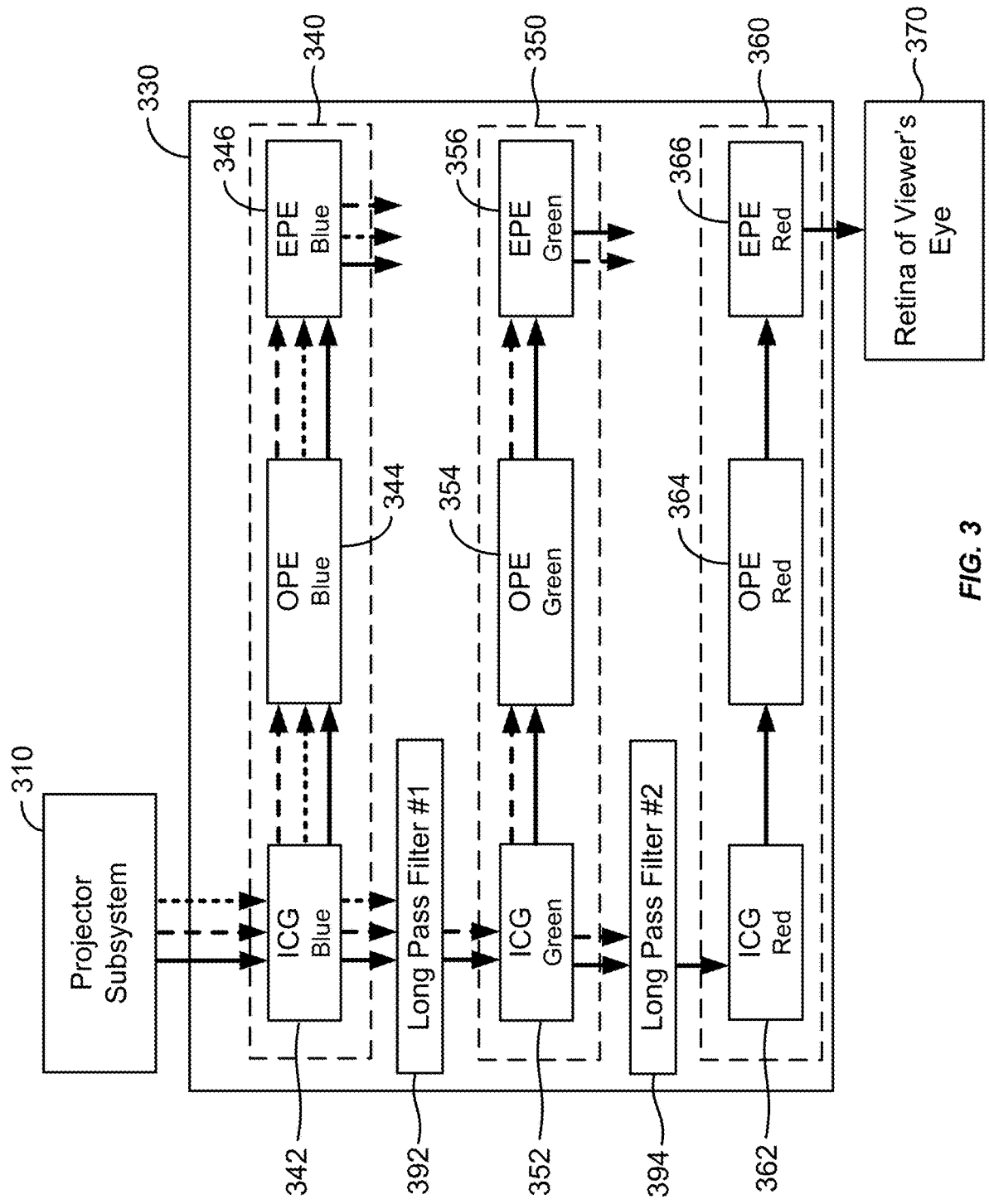
FIG. 3 illustrates schematically another method of color separation in an eyepiece for viewing a virtual image according to an embodiment of the present invention.

FIG. 3 illustrates schematically another method of color separation using an "in-line" approach according to an embodiment of the present invention. In this example, the eyepiece 330 may also include a blue waveguide 340, a green waveguide 350, and a red waveguide 360. Each waveguide 340, 350, or 360 may include an ICG 342, 352, or 362, an OPE region 344, 354, or 364, and a EPE region 346, 356, or 366. Here, image light in blue, green, and red colors generated by the projector subsystem 310 are not spatially separated from each other, and the ICGs 342, 352, and 362 in the blue, green, and red waveguides 340, 350, and 360 are laterally aligned with respect to each other. Thus, image light pass through each waveguide sequentially in a "serial" fashion. The eyepiece 330 may further include a first wavelength-selective optical element 392 positioned between the ICG 342 in the blue waveguide 340 and the ICG 352 in the green waveguide 350, and a second wavelength-selective optical element 394 positioned between the ICG 352 in the green waveguide 350 and the ICG 362 in the red waveguide 360. The first and second wavelength-selective optical elements 392 and 394 may, for instance, represent wavelength-selective optical filters (i.e., optical elements that selectively transmit light in a particular range of wavelengths) and/or wavelength-selective optical reflectors (i.e., mirrors and other optical elements that selectively reflect light in a particular range of wavelengths). As described in further detail below, a dichroic filter is one example of an optical element configured to both selectively transmit and reflect light on the basis of wavelength. In the following, the first and second wavelength-selective optical elements 392 and 394 may also be referred to as "optical filter 392" and "optical filter 394," respectively. Similarly, other wavelength-selective optical elements described with reference to any of FIGS. 4-14 may also be referred to herein as "optical filters."

As illustrated in FIG. 3, image light in all three colors is incident on the ICG 342 in the blue waveguide 340. The ICG 342 in the blue waveguide 340 may couple a portion of the image light primarily in the blue wavelength range into the blue waveguide 340 to be guided toward the OPE region 344. The ICG 342 in the blue waveguide 340 may also couple a small amount of green image light, and even a smaller amount of red light, into the blue waveguide 340, as will be discussed further later. Image light that is not coupled into the blue waveguide 340 is transmitted through the blue waveguide 340 and incident on the first optical filter 392. The first optical filter 392 may be configured to have a high transmittance value in the green and red wavelength ranges, and a low transmittance value in the blue wavelength range. Therefore, image light transmitted by the first optical filter 392 and incident on the ICG 352 in the green waveguide 350 may contain primarily green image light and red image light, and very little or no blue image light.

Still referring to FIG. 3, the ICG 352 in the green waveguide 350 may couple a portion of the image light primarily in the green wavelength range into the green waveguide 350 to be guided toward the OPE region 354. The ICG 352 in the green waveguide 350 may also couple a small amount of red image light into the green waveguide 350, as will be discussed further later. Image light that is not coupled into the green waveguide 350 may be transmitted through the green waveguide 350 and incident on the second optical filter 394. The second optical filter 394 may be configured to have a high transmittance value in the red wavelength range, and a low transmittance value in the green and blue wavelength ranges. Therefore, image light transmitted by the second optical filter 394 and incident on the ICG 362 in the red waveguide 360 may contain primarily red image light, and very little or no green image light and blue image light. The ICG 362 in the red waveguide 360 may couple a portion of the image light primarily in the red wavelength range into the red waveguide 360 to be guided toward the OPE region 364.

Figure 4:
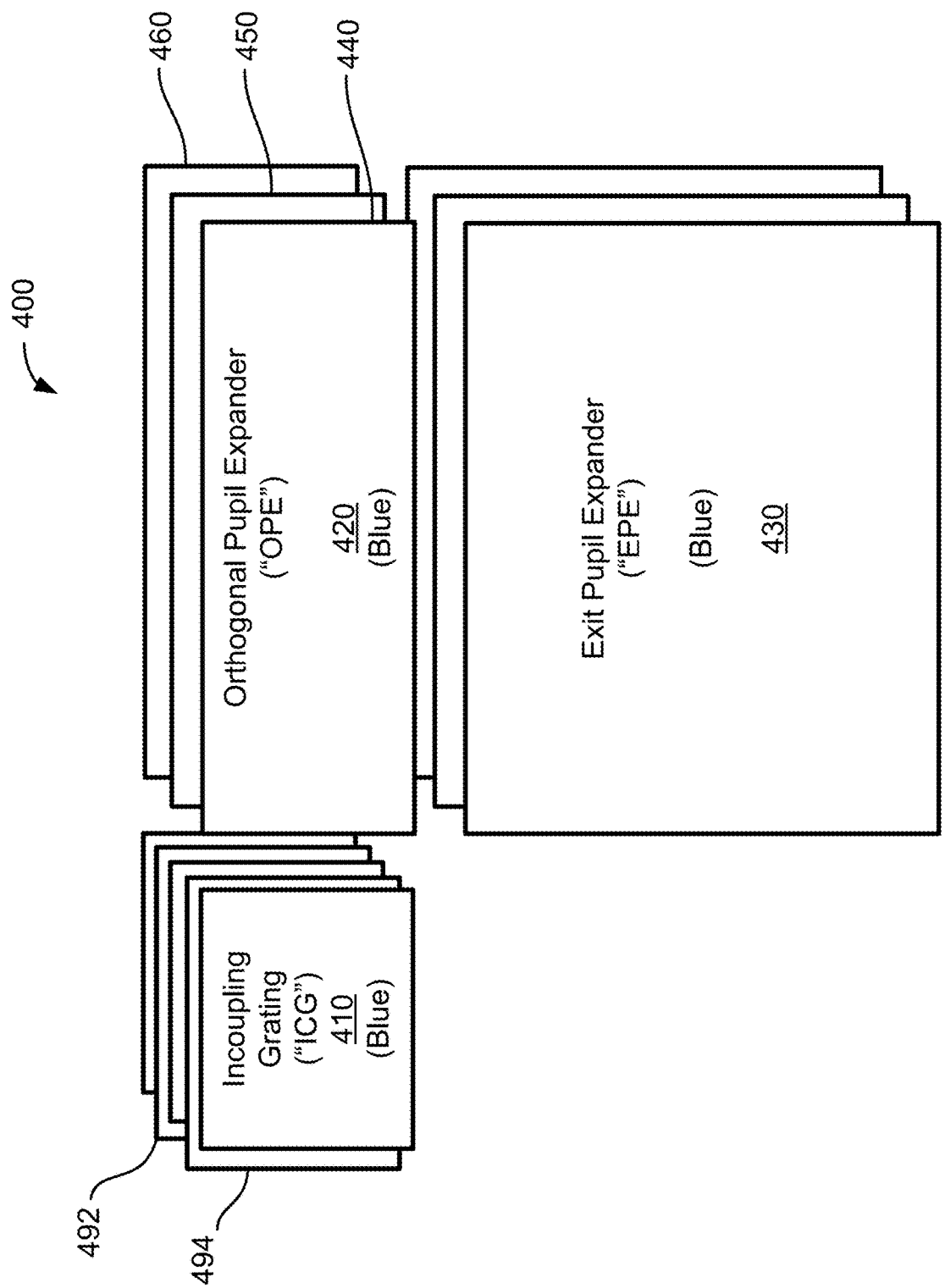
FIG. 4 illustrates schematically a plan view of an eyepiece according to an embodiment of the present invention.

FIG. 4 illustrates schematically a plan view of an eyepiece 400 according to an embodiment of the present invention. The eyepiece 400 may include a blue waveguide 440, a green waveguide 450, and a red waveguide 460 stacked in adjacent lateral planes. Each waveguide 440, 450, or 460 may include an ICG region 410, an OPE region 420, and a EPE region 430. The ICG regions 410 for the three waveguides 440, 450, and 460 may be disposed in the same lateral position, and are thus stacked along the same optical path. A first optical filter 492 may be positioned between the ICG 410 of the blue waveguide 440 and the ICG 410 of the green waveguide 450. A second optical filter 492 may be positioned between the ICG 410 of the green waveguide 450 and the ICG 410 of the red waveguide 460. The eyepiece 400 illustrated in FIG. 4 may function substantially as described above with respect to FIG. 3. The eyepiece illustrated in FIGS. 3 and 4 may have a smaller form factor as compared to the eyepiece 230 illustrated FIG. 2, because the ICGs 410 in the three waveguides 440, 450, and 460 are disposed at the same lateral position instead of laterally displaced from each other.

Figure 5:
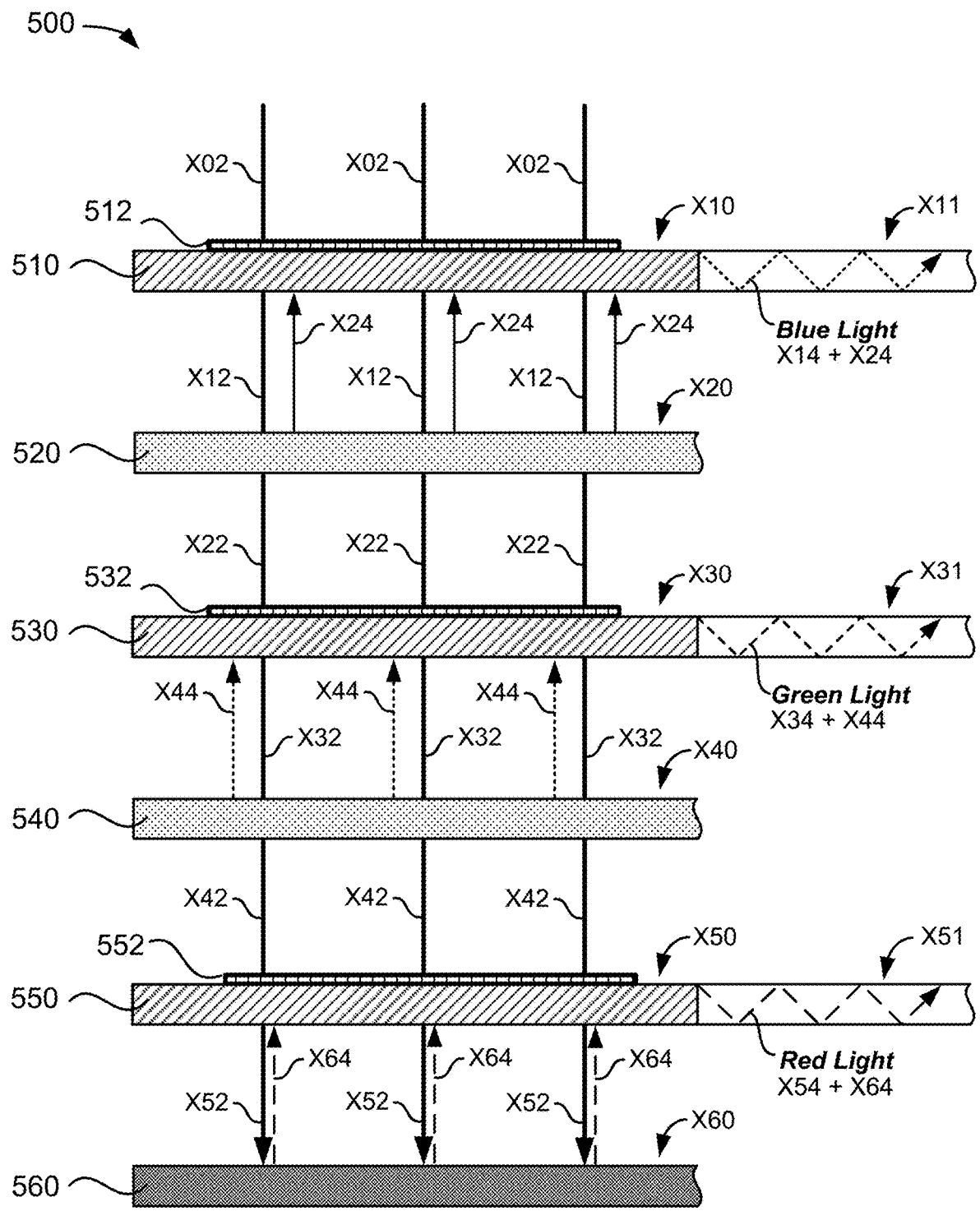
FIG. 5 illustrates schematically a partial cross-sectional view of an eyepiece according to an embodiment of the present invention.

FIG. 5 illustrates schematically a partial cross-sectional view of an eyepiece 500 according to an embodiment of the present invention. The eyepiece 500 may include a first planar waveguide 510, disposed in a first lateral plane. The first waveguide 510 may include a first lateral region (labeled as X10) and a second lateral region (labeled as X11). The first lateral region (X10) may be disposed at a lateral position and configured to receive image light (X02) incident on a first lateral surface thereof. The image light (X02) may include image light in a first wavelength range, image light in a second wavelength range, and image light in the third wavelength range. For example, the first wavelength range may be centered at about 462 nm wavelength corresponding to blue light, the second wavelength range may be centered at about 528 nm wavelength corresponding to green light, and the third wavelength range may be centered at about 635 nm wavelength corresponding to red light.

The eyepiece 500 may further include a first diffractive optical element (DOE) 512 optically coupled to the first lateral region (X10) of the first waveguide 510. The first DOE 512 may include an incoupling grating (ICG) formed either on the first surface of the first waveguide 510 (as shown in FIG. 5) or a second surface of the first waveguide 510 opposite to the first surface. The first DOE may be configured to diffract image light in the first wavelength range, e.g., blue image light (X14), into the first waveguide 510 to be guided toward the second lateral region (X11) of the first waveguide 510. The second lateral region (X11) may be a region between the ICG and an OPE (not shown). A portion of the image light (X12) that is not coupled into the first waveguide 510 may be transmitted through the first waveguide 510.

The eyepiece 500 may further include a first optical filter 520 positioned in a second lateral plane adjacent the first lateral plane at the same lateral position as the first lateral region (X10) of the first waveguide 510. The first optical filter 520 may be configured to receive the portion of the image light (X12) transmitted through the first waveguide 510. In one embodiment, the first optical filter 520 may be configured as a long-pass filter such that it has high transmittance values for the wavelength ranges corresponding to green and red light, and low transmittance values for the wavelength range corresponding to blue light. Thus, image light transmitted by the first optical filter 520 (X22) may contain primarily green and red image light.

The eyepiece 500 may further include a second planar waveguide 530 positioned in a third lateral plane adjacent the second lateral plane. The second waveguide 530 may have a first lateral region (X30) and a second lateral region (X31). The first lateral region (X30) may be disposed at the same lateral position as the first lateral region of the first waveguide 510, and may be configured to receive image light transmitted by the first optical filter 520 (X22) incident on a first lateral surface thereof.

The eyepiece may further include a second diffractive optical element (DOE) 532 optically coupled to the first lateral region (X30) of the second waveguide 530. The second DOE 532 may include an incoupling grating (ICG) formed either on the first surface of the second waveguide 530 (as shown in FIG. 5) or a second surface of the second waveguide 530 opposite to the first surface. The second DOE 532 may be configured to diffract image light in the second wavelength range, e.g., green image light (X34), into the second waveguide 530 to be guided toward the second lateral region (X31) of the second waveguide 530. The second lateral region (X31) may be a region between the ICG and an OPE (not shown). A portion of the image light (X32) that is not coupled into the second waveguide 530 may be transmitted through the second waveguide 530.

The eyepiece may further include a second optical filter 540 positioned in a fourth lateral plane adjacent the third lateral plane at the same lateral position as the first lateral region (X30) of the second waveguide 530. The second optical filter 540 may be configured to receive the portion of the image light (X32) transmitted through the second waveguide 530. In one embodiment, the second optical filter 540 may be configured as a long-pass filter such that it has high transmittance values for the wavelength range corresponding to red light, and low transmittance values for the wavelength ranges corresponding to blue and green light.

Thus, image light transmitted by the second optical filter 540 (X42) may contain primarily red image light.

The eyepiece 500 may further include a third planar waveguide 550 positioned in a fifth lateral plane adjacent the fourth lateral plane. The third waveguide 550 may have a first lateral region (X50) and a second lateral region (X51). The first lateral region (X50) may be disposed at the same lateral position as the first lateral region (X30) of the second waveguide 530, and may be configured to receive image light transmitted by the second optical filter 540 (X42) incident on a first lateral surface thereof.

The eyepiece 500 may further include a third diffractive optical element (DOE) 552 optically coupled to the first lateral region (X50) of the third waveguide 550. The third DOE 552 may include an incoupling grating (ICG) (not shown) formed either on the first surface of the third waveguide 550 (as shown in FIG. 5) or a second surface of the third waveguide 550 opposite to the first surface. The third DOE 552 may be configured to diffract image light in the third wavelength range, e.g., red image light (X54), into the third waveguide 550 to be guided toward the second lateral region (X51) of the third waveguide 550. The second lateral region (X51) may be a region between the ICG and an OPE (not shown). A portion of the image light (X52) that is not coupled into the third waveguide 550 may be transmitted through the third waveguide 550.

According to some other embodiments, the order of the red-green-blue waveguides 510, 530, and 550 may be different from that illustrated in FIG. 5. Further, the eyepiece 500 may include fewer than three waveguides (e.g., two waveguides), or more than three waveguides (e.g., nine waveguides, three for each color), according to some embodiments. In some embodiments, the eyepiece 500 may include waveguides for colors other than red, green, and blue. For example, it may include waveguides for magenta and cyan, in place of or in addition to red, green, and blue.

In some embodiments, the first optical filter 520 may be configured as a dichroic long-pass filter that transmits green and red light, and reflects blue light. Thus, a portion of the image light (X12) transmitted through the first waveguide 510 that is in the blue wavelength range (X24) may be reflected back toward the first waveguide 510 and be diffracted by the first DOE into the first waveguide 510 to be guided to the OPE and EPE in the first waveguide 510, and be output to the viewer. As such, the brightness and contrast of the blue light field that is output to the viewer may be enhanced.

Similarly, the second optical filter 540 may be configured as a dichroic long-pass filter that transmits red light, and reflects blue and green light. Thus, a portion of the image light (X32) transmitted through the second waveguide 530 that is in the green wavelength range (X44) may be reflected back toward the second waveguide 530 and be diffracted by the second DOE into the second waveguide 530 to be guided to the OPE and EPE in the second waveguide 530, and be output to the viewer. As such, the brightness and contrast of the green light field that is output to the viewer may be enhanced.

In some embodiments, the eyepiece may further include an optical reflector 560 positioned in a sixth lateral plane adjacent the fifth lateral plane at the same lateral position as the second lateral region (X50) of the third waveguide 550. Much like the abovementioned dichroic long-pass filters, the optical reflector 560 may be configured to reflect image light transmitted through the third waveguide 550 (X52) back toward the third waveguide 550. A portion of the image light reflected by the optical reflector 560 (X64) in the red wavelength range may be diffracted by the third DOE into the third waveguide 550 to be guided to the OPE and EPE of the third waveguide 550, and be output to the viewer. In some examples, the optical reflector 560 may be implemented as a wavelength-selective optical element, such as a dichroic filter configured to reflect light in at least the red wavelength range. In other examples, the optical reflector 560 may be implemented as a mirror or other optical element configured to reflect a relatively wide range of wavelengths. In either case, the brightness and contrast of the red light field that is output to the viewer may be enhanced.

FIGS. 6A-6D illustrate some example images formed by an eyepiece without dichroic filters according to an embodiment. FIG. 6A is an image formed by image light that includes red image light, green image light, and blue image light. FIGS. 6B-6D are images formed by red image light, green image light, and blue image light, respectively. FIG. 6E-6H illustrate some example images formed by an eyepiece with dichroic filters, such as the eyepiece 500 illustrated in FIG. 5, according to an embodiment. FIG. 6E is an image formed by image light that includes red image light, green image light, and blue image light. FIGS. 6F-6H are images formed by red image light, green image light, and blue image light, respectively. As can be seen, the images formed by an eyepiece with dichroic filters may be brighter than those formed by an eyepiece without dichroic filters. Indeed, the reflective properties of dichroic filters can serve to enhance brightness in waveguide-based eyepieces.

Figure 7:
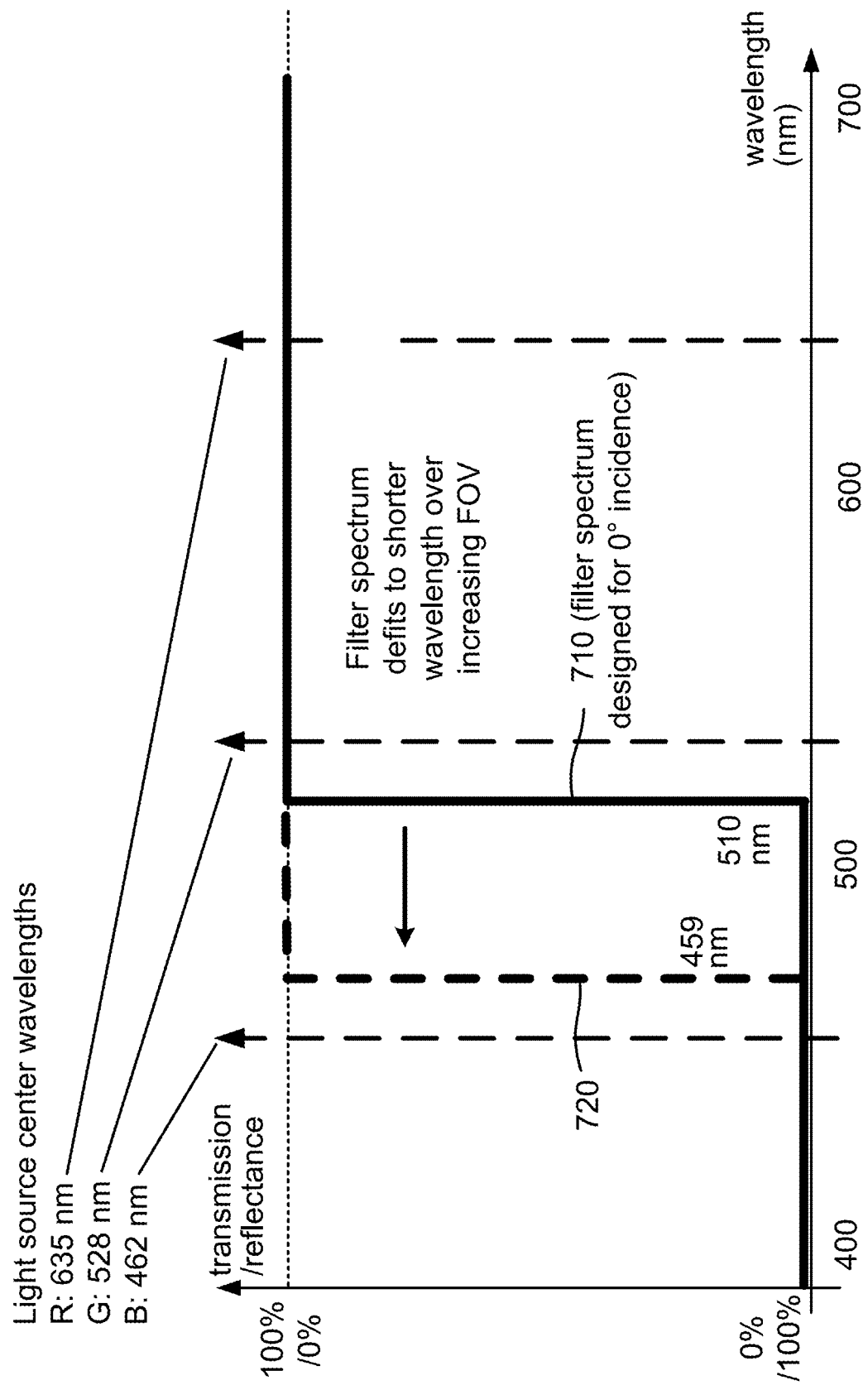
FIG. 7 illustrates schematically a transmittance/reflectance curve of an optical filter according to an embodiment of the present invention.

FIG. 7 illustrates schematically a transmittance/reflectance curve for the first optical filter 520 according to an embodiment of the present invention. The first optical filter 520 may be configured as a long-pass filter that has high transmittance values (e.g., close to 100%) and low reflectance values (e.g., close to 0%) for wavelengths longer than a threshold wavelength (e.g., 510 nm), and low transmittance values (e.g., close to 0%) and high reflectance values (e.g., close to 100%) for wavelengths shorter than the threshold wavelength.

In some embodiments, the first optical filter 520 may be configured to have transmittance values greater than about 90% for wavelengths longer than a threshold wavelength (e.g., 510 nm), and transmittance values less than about 10% for wavelengths shorter than the threshold wavelength. In some other embodiments, the first optical filter 520 may be configured to have transmittance values greater than about 80% for wavelengths longer than a threshold wavelength (e.g., 510 nm), and transmittance values less than about 20% for wavelengths shorter than the threshold wavelength. The first optical filter 520 may have other transmittance value ranges. Color contrast may vary depending on the transmittance value ranges.

The first optical filter 520 may include, for example, a multi-layer thin-film filter. The transmittance/reflectance curve of a multi-layer thin-film filter is typically sensitive to angle of incidence. For example, the first optical filter 520 may be designed to have the transmittance/reflectance curve represented by the solid line 710 for a zero-degree angle of incidence (i.e., normal incidence), where the threshold wavelength is about 510 nm. For increasing angle of incidence, the threshold wavelength may shift to shorter wavelengths. For example, the threshold wavelength may shift to about 459 nm for a 45-degree angle of incidence as indicated by the dashed line 720. In some embodiments, the first optical filter 520 may be designed such that the threshold wavelength stays below the center wavelength of green image light (e.g., 528 nm) and above the center wavelength of blue image light (e.g., 462 nm) for a predetermined range of angles of incidence. In one embodiment, the predetermined range of angles of incidence may be from about zero degree to about 45 degrees, for a 90-degree field of view (FOV). In another embodiment, the predetermined range of angles of incidence may be from about zero degree to about 25 degrees, for a 50-degree FOV. Such filter design may enable angle-insensitive operation for the first optical filter 520. That is, the first optical filter 520 will transmit green and red light and reflect blue light, as long as the angle of incidence of the image light is within the predetermined range.

Figure 8:
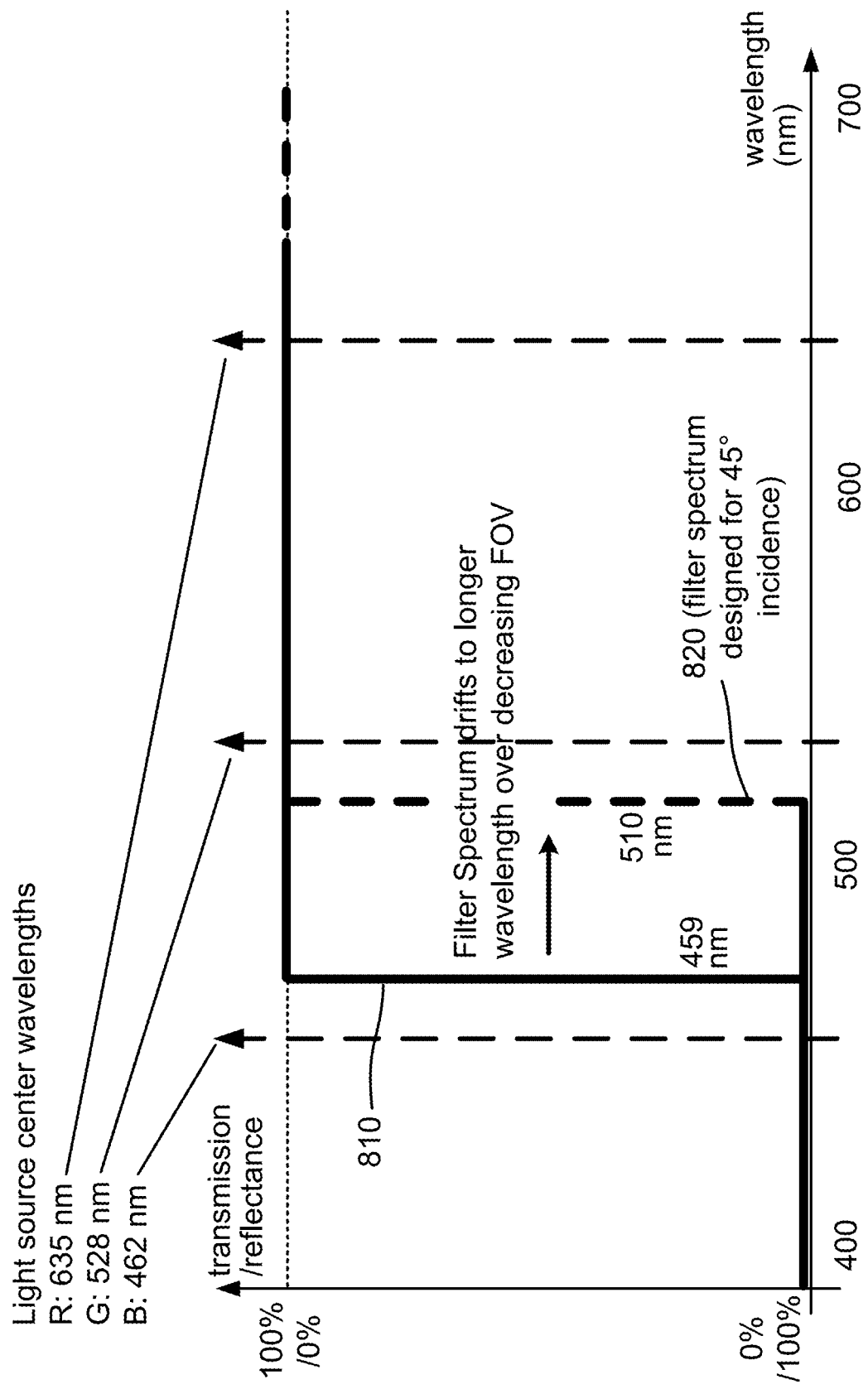
FIG. 8 illustrates schematically a transmittance/reflectance curve of an optical filter according to another embodiment of the present invention.

FIG. 8 illustrates schematically a transmittance/reflectance curve for the first optical filter 520 according to another embodiment of the present invention. Here, the first optical filter 520 may be designed to have the transmittance/reflectance curve represented by the solid line 810 for a 45-degree angle of incidence, where the threshold wavelength is about 459 nm. For decreasing angle of incidence, the threshold wavelength may shift to longer wavelengths. For example, the threshold wavelength may shift to about 510 nm for a zero-degree angle of incidence as indicated by the dashed line 820. The first optical filter 520 may be designed such that the threshold wavelength stays below the center wavelength of green image light (e.g., 528 nm) and above the center wavelength of blue image light (e.g., 462 nm) for a predetermined range of angles of incidence, for angle-insensitive operation.

The second optical filter 540 may also be designed for angle-insensitive operation. For example, the second optical filter 540 may be designed as a long-pass filter that has a threshold wavelength below the center wavelength of red image light (e.g., 635 nm) and above the center wavelength of green image light (e.g., 528 nm) for a predetermined range of angles of incidence.

Referring to FIG. 5, in some other embodiments, the red-green-blue waveguides 510, 530, and 550 may be ordered differently. For example, the first waveguide 510 may be configured as a red waveguide, the second waveguide 530 may be configured as a green waveguide, and the third waveguide 550 may be configured as a blue waveguide. In that case, the first optical filter 520 may be configured as a short-pass filter that has high transmittance values in the blue and green wavelength ranges and a low transmittance value in the red wavelength range. Similarly, the second optical filter 550 may be configured as a short-pass filter that has a high transmittance value in the blue wavelength range and low transmittance values in the green and red wavelength ranges.

As another example, the first waveguide 510 may be configured as a blue waveguide, the second waveguide 530 may be configured as a red waveguide, and the third waveguide 550 may be configured as a green waveguide. In that case, the first optical filter 520 may be configured as a long-pass filter that has high transmittance values in the green and red wavelength ranges and a low transmittance value in the blue wavelength range. The second optical filter 540 may be configured as a short-pass filter that has a high transmittance value in the green wavelength range and a low transmittance value in the red wavelength range.

Referring to FIG. 5, as described above, the first DOE 512 (also referred to as an ICG) coupled to the first lateral region (X10) of the first waveguide 510 may be designed to diffract primarily blue light into the first waveguide 510. In practice, the first DOE 512 may also diffract (i.e., cross-couple) a small amount of green light into the first waveguide 510. FIG. 9A illustrates this situation. There, blue image light, green image light, and red image light are incident on the first waveguide 510. While the first DOE 512 diffracts primarily blue light into the first waveguide 510 to be guided toward the second lateral region (X11), a small amount of green image light may also be diffracted by the first DOE 512 into the first waveguide 510.

Figure 10:
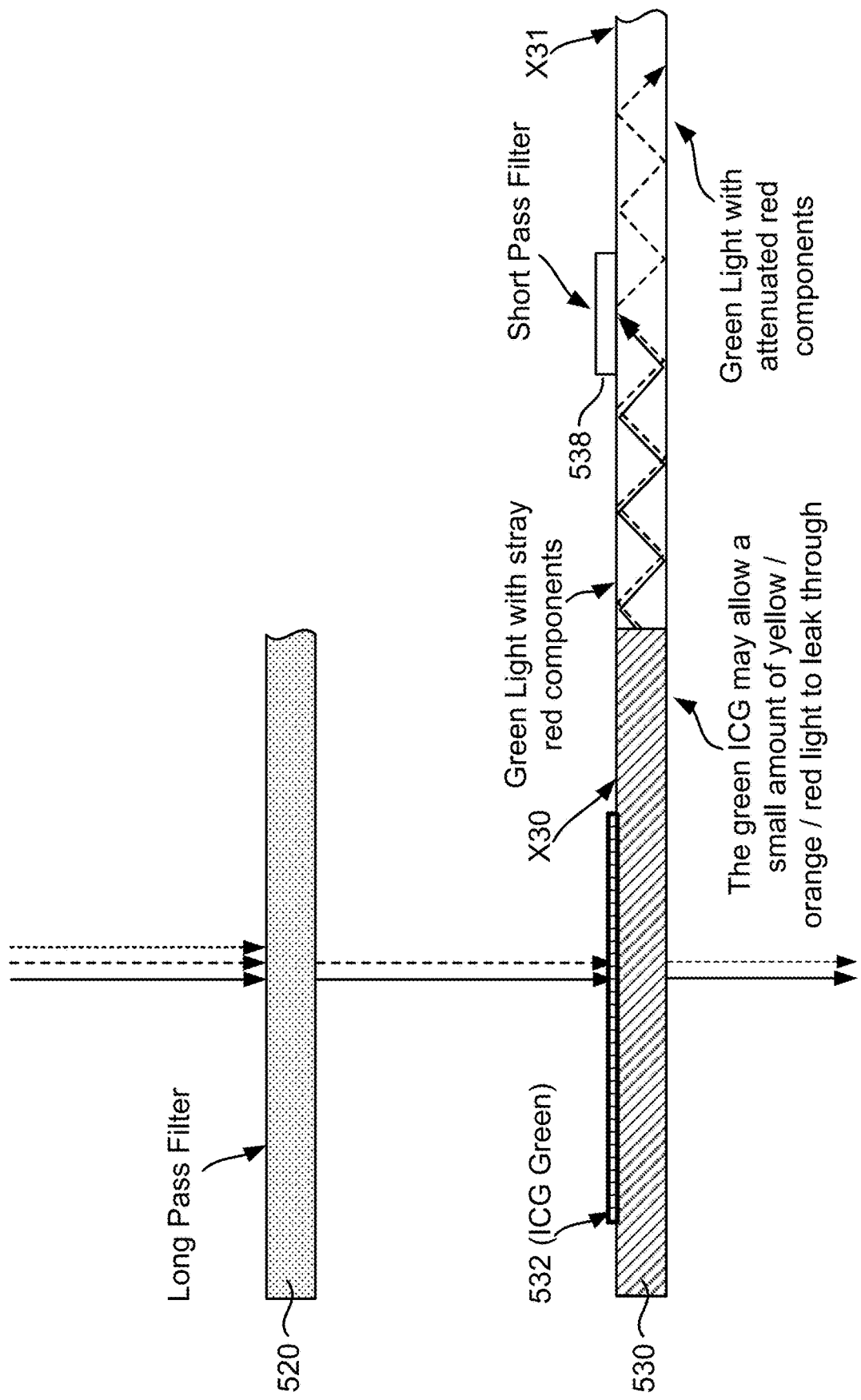
FIG. 10 illustrates schematically a partial cross-sectional view of a waveguide including a short-pass filter coupled thereto according to an embodiment of the present invention.

Similarly, the second DOE 532 coupled to the first lateral region (X30) of the second waveguide 530 may be designed to diffract primarily green light into the second waveguide 530. In practice, the second DOE 532 may also cross-couple a small amount of red light into the second waveguide 530. FIG. 10 illustrates this situation. There, green image light and red image light may be transmitted by the long-pass filter 520 and incident on the second waveguide 530. While the second DOE 532 diffracts primarily green light into the second waveguide 530 to be guided toward the second lateral region (X31), a small amount of red image light may also be diffracted by the second DOE into the second waveguide 530.

Figure 11A:
FIGS. 11A-11D illustrate the wavelength cross-coupling effect of the waveguides in an eyepiece.
Figure 11B:
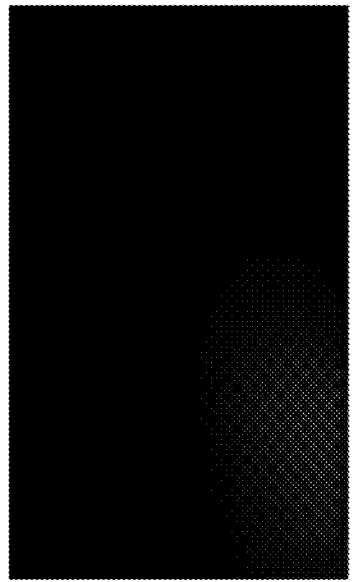
Figure 11C:
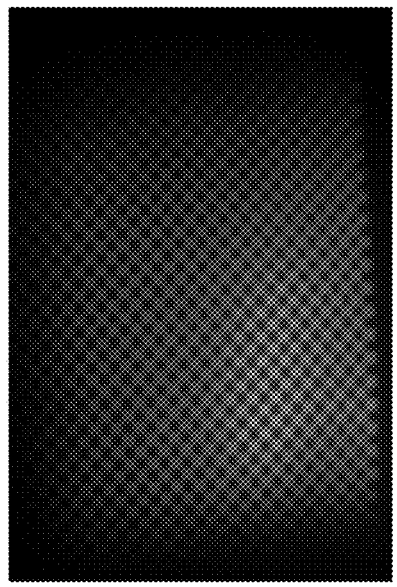
Figure 11D:
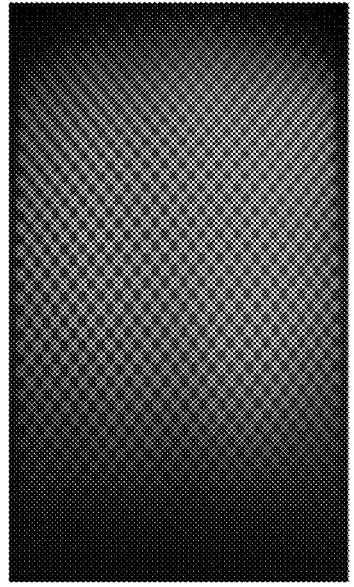

FIGS. 11A-11D illustrate the wavelength "cross-coupling" effect. FIG. 11A shows an image of a blue light field formed by a blue waveguide. FIG. 11B shows an image of a green light field that is cross-coupled by the blue waveguide. FIG. 11C shows an image of a green light field formed by a green waveguide. FIG. 11D shows an image of a red light field that is cross-coupled by the green waveguide.

According to an embodiment of the present invention, the first waveguide 510 may include a first short-pass filter 518 coupled to the second lateral region (X11) of the first waveguide 510, as illustrated in FIG. 9A. The first short-pass filter 518 may be configured to pass blue light and absorb green light, so that the green image light cross-coupled into the first waveguide 510 may be absorbed by the first short-pass filter 518 and thus may be prevented from propagating to the OPE and the EPE regions of the first waveguide 510.

According to an embodiment, the second waveguide 530 may also include a second short-pass filter 538 coupled to the second lateral region (X31) of the second waveguide 530, as illustrated in FIG. 10. The second short-pass filter 538 may be configured to pass green light and absorb red light, so that the red image light cross-coupled into the second waveguide 530 may be absorbed by the second short-pass filter 538 and thus may be prevented from propagating to the OPE and the EPE regions of the second waveguide 530.

FIG. 9B illustrates schematically a cross-sectional view of the short-pass filter 518 according to an embodiment of the present invention. The short-pass filter 518 may be disposed on an outer surface of the second lateral region (X11) of the first waveguide 510. In some embodiments, the short-pass filter 518 may include a dichroic layer 910 disposed on the outer surface of the first waveguide 510. The dichroic layer 910 may include, for example, a multi-layer thin-film designed to have a transmittance/reflectance curve similar to that illustrated in FIG. 7, where the threshold wavelength is below the center wavelength of green image light (e.g., 528 nm) and above the center wavelength of blue image light (e.g., 462 nm) for a predetermined range of angle of incidence. As such, the dichroic layer 910 may reflect blue image light incident thereon back into the first waveguide 510 to be guided toward the EPE region, and transmit green image light incident thereon. The short-pass filter 518 may further include a terminating substrate 920 (e.g., a glass layer) disposed on the dichroic layer 910, and an absorptive layer 930 disposed on the terminating substrate 920. The absorptive layer 930 may be configured to absorb light transmitted by the dichroic layer 910.

Figure 12A:
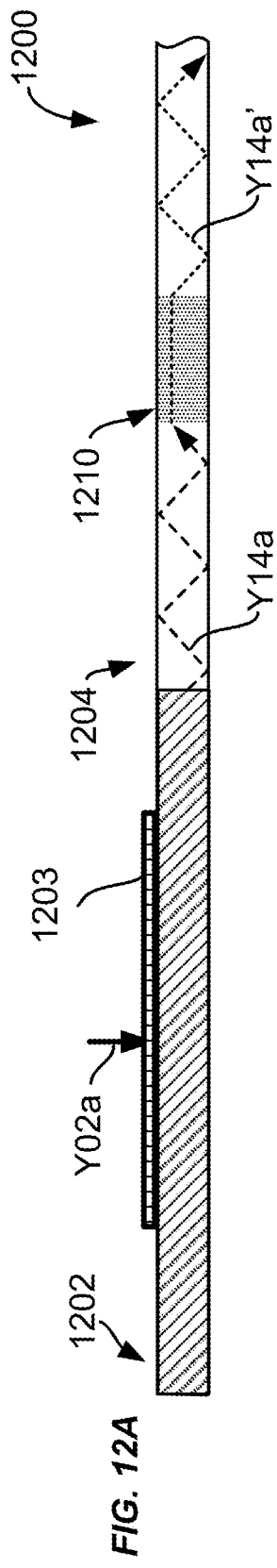
FIGS. 12A-12C illustrate schematically partial cross-sectional views of waveguides including a short-pass filter coupled thereto according to embodiments of the present invention.

FIG. 12A illustrates schematically a waveguide 1200 according to some embodiments. The waveguide 1200 may include a first lateral region 1202 and a second lateral region 1204. The waveguide 1200 may also include a diffractive optical element (DOE) 1203 optically coupled to the first lateral region 1202, and configured to diffract a portion of the incident light Y02a into the waveguide 1200. For example, the DOE 1203 may be designed to diffract primarily blue light into the first waveguide 1200. In practice, the DOE may also diffract (i.e., cross-couple) a small amount of green light into the first waveguide 1200, as discussed above.

The waveguide 1200 may also include a short-pass filter 1210 coupled to the second lateral region 1204 of the waveguide 1200. The short-pass filter 1210 may include particles with index-matched characteristics embedded into the waveguide 1200, for example by a substrate doping process. The particles may absorb, for example, green light or light having a wavelength longer than that of blue light, and transmit blue light. In some embodiments, index matching may not be a strict requirement. In such cases, light may refract at the interfaces between the particles and the waveguide medium, but may nevertheless continue to propagate at the original angles. It may be desirable to minimize the scattering at points of discontinuity.

Figure 12B:
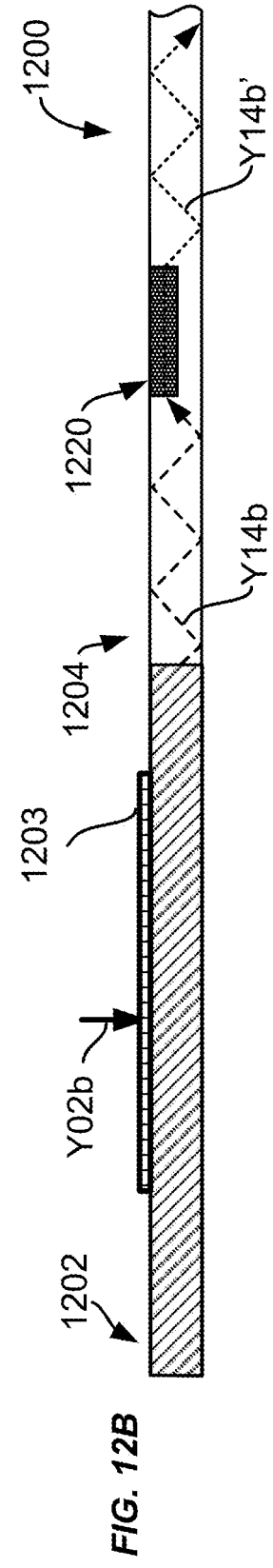

FIG. 12B illustrates schematically a waveguide 1200 according some other embodiments. The waveguide 1200 may include a short-pass filter 1220 coupled to the second lateral region 1204 of the waveguide 1200. Here, the short-pass filter 1220 may include a cavity inside the second lateral region 1204 of the waveguide 1200, where a top surface of the cavity is flush with the outer surface of the waveguide 1200. The cavity may be filled with an index-matched dye that absorbs green light or light having a wavelength longer than that of blue light. In some embodiments, instead of making and filling a cavity, the filter can be created by diffusing a dye through the surface of the waveguide 1200, producing a partially or fully dyed (or "doped") volume within the waveguide 1200. In one embodiment, the refractive index of the dye may be matched to the refractive index of the waveguide 1200, so that the dye does not affect the propagation of blue image light in the waveguide 1200 by total internal reflection (TIR). In some other embodiments, some index mismatch may be allowed so long as it does not affect the propagation, and scattering at the interfaces is controlled to some degree.

Figure 12C:
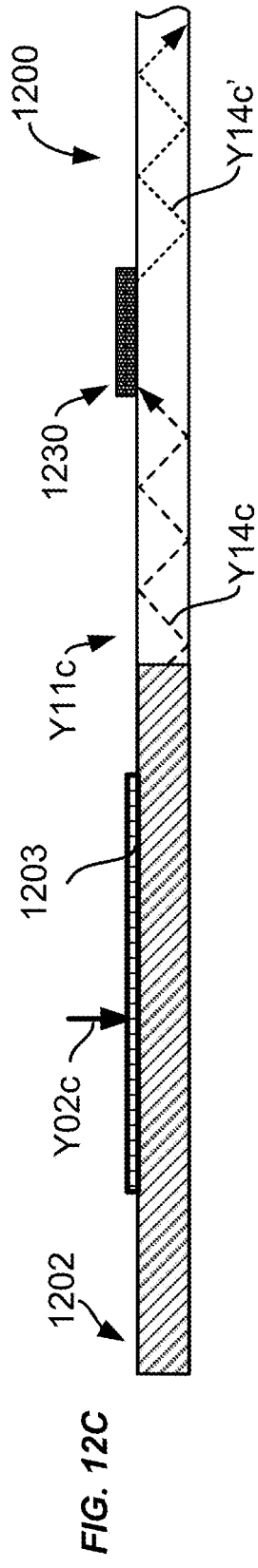

FIG. 12C illustrates schematically a waveguide 1200 according some further embodiments. The waveguide 1200 may include a layer of dye 1230 applied to the outer surface of the second lateral region 1204 of the waveguide 1200. The layer of dye (Y13c) may absorb green light or light having a wavelength longer than that of blue light, and reflects blue light.

FIG. 13A illustrates a partial cross-sectional view of an eyepiece according to another embodiment of the present invention. The eyepiece may include a first planar waveguide 1310 positioned in a first lateral plane, a second planar waveguide 1340 positioned in a second lateral plane adjacent the first lateral plane, and a third planar waveguide 1370 positioned in a third lateral plane adjacent the third lateral plane. Input image light is split into two optical paths, where blue and red image light is incident on the eyepiece at a first lateral position, and green image light is incident on the eyepiece at a second lateral position displaced from the first lateral position.

The eyepiece may further include a first diffractive optical element (DOE) 1320, such as an incoupling grating (ICG), disposed on a first surface of the first waveguide 1310 at the second lateral position. The first DOE is configured to receive and diffract a portion of the green image light incident thereon into the first waveguide 1310 to be guided to the OPE and the EPE region of the first waveguide 1310. The eyepiece may further include a first optical reflector 1330 disposed on a second surface of the first waveguide 1310 at the second lateral position. In some examples, the optical reflector 1330 may be implemented as a wavelength-selective optical element, such as a dichroic filter configured to reflect light in at least the green wavelength range. In other examples, the optical reflector 1330 may be implemented as a mirror or other optical element configured to reflect a relatively wide range of wavelengths (e.g., aluminized material). It follows that, in either case, the first optical reflector 1330 may be configured to reflect green image light that is not coupled into the first waveguide 1310 by the first DOE 1320 on the first pass back toward the first DOE 1320. A portion of the green image light reflected by the first optical reflector 1330 may be diffracted by the first DOE 1320 into the first waveguide 1310. Therefore, the brightness and contrast of the green light field that is output to the viewer may be enhanced.

The eyepiece may further include a second DOE 1350 disposed on the first surface of the second waveguide 1340 at the first lateral position. The second DOE 1350 may be configured to receive and diffract a portion of the blue image light incident thereon into the second waveguide 1340 to be guided toward the OPE and the EPE region of the second waveguide 1340. The eyepiece may further include an optical filter 1360 (i.e., a wavelength-selective optical element) disposed on a second surface of the second waveguide 1340 at the first lateral position. The optical filter 1360 may include a dichroic long-pass filter configured to have a high transmittance value for red image light, and a low transmittance value and a high reflectance value for blue image light. Thus, the portion of blue image light that is not coupled into the second waveguide 1340 by the second DOE 1350 on the first pass may be reflected back toward the second DOE 1350 and be coupled into the second waveguide 1340 by the second DOE 1350. Therefore, the brightness and contrast of the blue light field that is output to the viewer may be enhanced. Red image light transmitted by the optical filter 1360 is incident on the third waveguide 1370.

The eyepiece may further include a third DOE 1380 disposed on the first surface of the third waveguide 1370 at the first lateral position. The third DOE 1380 may be configured to receive and diffract a portion of the red image light incident thereon into the third waveguide 1370 to be guided toward the OPE and the EPE region of the third waveguide 1370. The eyepiece may further include a second optical reflector 1390 disposed on a second surface of the third waveguide 1370 at the first lateral position. In some examples, the optical reflector 1390 may be implemented as a wavelength-selective optical element, such as a dichroic filter configured to reflect light in at least the red wavelength range. In other examples, the optical reflector 1390 may be implemented as a mirror or other optical element configured to reflect a relatively wide range of wavelengths (e.g., aluminized material). In either case, the second optical reflector 1390 may be configured to reflect red image light that is not coupled into the third waveguide 1370 by the third DOE 1380 on the first pass back toward the third DOE 1380. A portion of the red image light reflected by the second optical reflector 1390 may be diffracted by the third DOE 1380 into the third waveguide 1370. Therefore, the brightness and contrast of the red light field that is output to the viewer may be enhanced.

FIG. 13B illustrates a partial cross-sectional view of an eyepiece according to a further embodiment of the present invention. The eyepiece illustrated in FIG. 13B is similar to the eyepiece illustrated in FIG. 13A, except that the first DOE is disposed on the second surface of the first waveguide 1310, the same surface as the first optical reflector 1330, the second DOE 1350 is disposed on the second surface of the second waveguide 1340, the same surface as the optical filter 1360, and the third DOE 1380 is disposed on the second surface of the third waveguide 1370, the same surface as the second optical reflector 1390.

FIG. 13C illustrates a partial cross-sectional view of an eyepiece according to a yet another embodiment of the present invention. The eyepiece illustrated in FIG. 13C is similar to the eyepiece illustrated in FIG. 13B, except that the optical filter 1360 is disposed on the first surface of the third waveguide 1370.

Each of the embodiments illustrated in FIGS. 13A-13C may have its own pros and cons. In the embodiment illustrated in FIG. 13A, because the first DOE, the second DOE, and the third DOE are formed on the first surface of the waveguide, they operate in transmission mode. In comparison, in the embodiments illustrated in FIGS. 13B and 13C, the first DOE, the second DOE, and the third DOE are formed on the second surface of the waveguide, and thus operate in reflection mode. The DOEs may be more efficient in reflection mode than in transmission mode. Having the DOEs aluminized in reflection mode may further increase diffraction efficiency. Having the DOE and the dichroic filter on opposite surfaces may be more challenging to manufacture, as it requires patterning on both surfaces.

Figure 14:
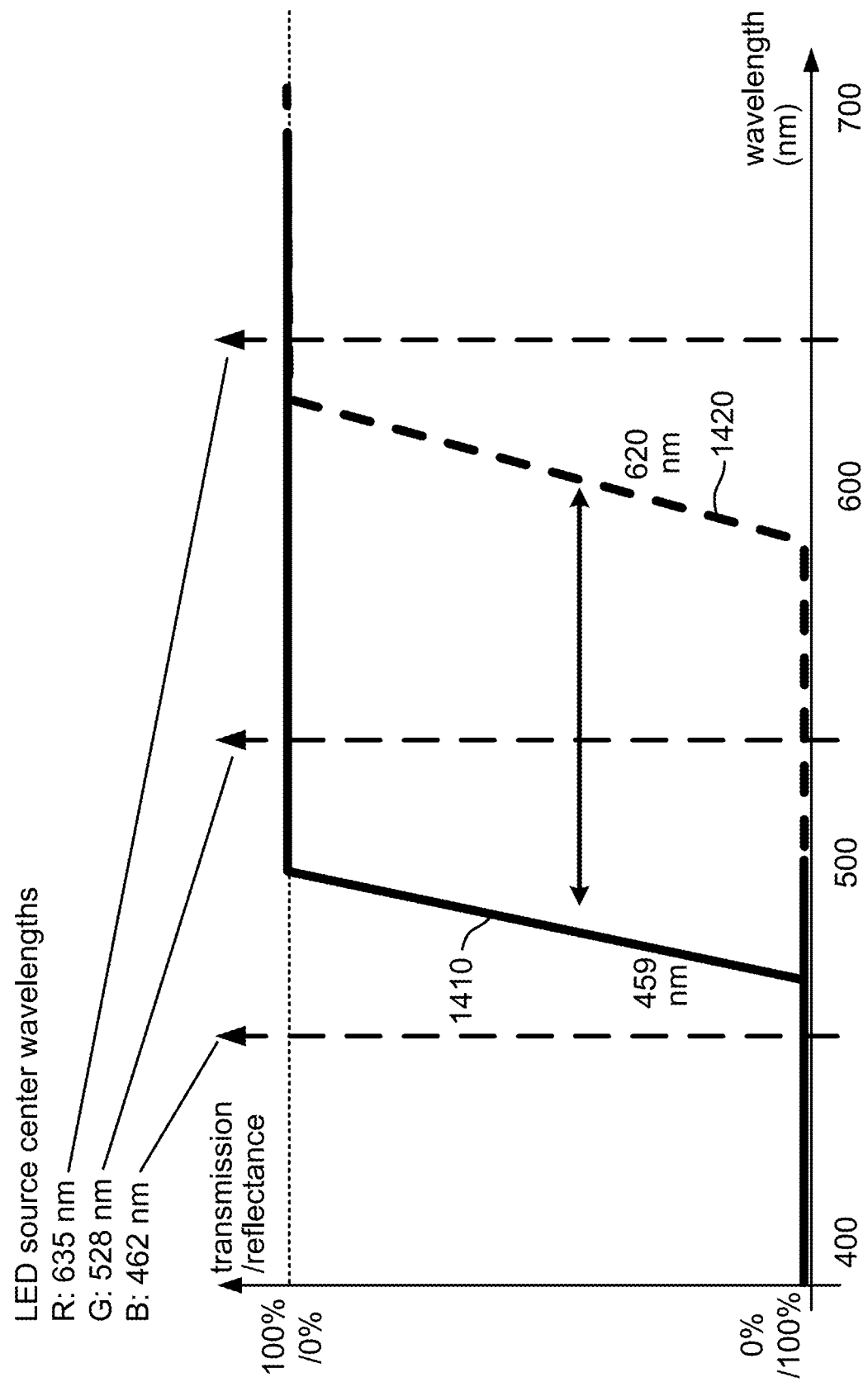
FIG. 14 illustrates schematically a transmittance/reflectance curve of an optical filter according to an embodiment of the present invention.

FIG. 14 illustrates schematically a transmittance/reflectance curve of the optical filter 1360 according to an embodiment of the present invention. The transmittance/reflectance curve of the optical filter 1360 is similar to those illustrated in FIGS. 7 and 8, in that it exhibits high transmittance values (e.g., close to 100%) and low reflectance values (e.g., close to 0%) for wavelengths longer than a threshold value, and low transmittance values (e.g., close to 0%) and high reflectance values (e.g., close to 100%) for wavelengths shorter than the threshold value.

The optical filter 1360 may include a multi-layer thin-film whose transmittance/reflectance characteristics may be sensitive to angle of incidence as discussed above. For example, the optical filter 1360 may be designed to have the transmittance/reflectance curve represented by the solid line 1410 for an angle of incidence of 45 degrees. For decreasing angle of incidence, the rising edge may shift to longer wavelengths. For example, the transmittance/reflectance curve for a zero-degree angle of incidence may be represented by the dashed line 1420.

As discussed above, to enable angle-insensitive operation for the optical filter 1360, it may be desirable that the rising edge of the transmittance/reflectance curve stay below the center wavelength of red image light (e.g., 635 nm) and above the center wavelength of blue image light (e.g., 462 nm) for a predetermined range of angle of incidence (e.g., from about zero degree to about 45 degrees). Here, because only blue and red image light is incident on the optical filter 1360, and because the center wavelengths of blue image light and red image light are relatively far apart from each other, the requirement on the transmittance/reflectance profile can be more relaxed. For example, the rising edge of the transmittance/reflectance curve may shift by a larger wavelength range between a zero-degree angle of incidence and a 45-degree angle of incidence, as compared to that illustrated in FIGS. 7 and 8. Also, the rising edge of the transmittance/reflectance curve may not need to be as steep as those illustrated in FIGS. 7 and 8. Thus, the eyepiece illustrated in FIGS. 13A-13C may afford a smaller form factor as compared to the eyepiece illustrated in FIG. 2 where the blue-green-red image light is separated into three separate light paths, while having a less stringent requirement for the filter's transmittance/reflectance profile.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An eyepiece for projecting an image to an eye of a viewer, the eyepiece comprising:
a first planar waveguide positioned in a first lateral plane, wherein the first planar waveguide comprises a first incoupling element optically coupled thereto, and wherein the first incoupling element is configured to diffract image light in a first wavelength range centered at a first wavelength;
a second planar waveguide positioned in a second lateral plane adjacent the first lateral plane, wherein the second planar waveguide comprises a second incoupling element optically coupled thereto, and wherein the second incoupling element is configured to diffract image light in a second wavelength range centered at a second wavelength different from the first wavelength; and
a first optical element positioned between the first planar waveguide and the second planar waveguide in lateral alignment with the first incoupling element, wherein the first optical element is configured to reflect image light in the first wavelength range.

2. The eyepiece of claim 1 wherein the first planar waveguide comprises a first surface and a second surface opposite to the first surface, the second planar waveguide comprises a first surface and a second surface opposite to the first surface, and wherein the first surface of the second planar waveguide faces the second surface of the first planar waveguide.

3. The eyepiece of claim 2 wherein the first incoupling element is disposed on the second surface of the first planar waveguide adjacent the first surface of the second planar waveguide.

4. The eyepiece of claim 2 further comprising:
a second optical element positioned adjacent the second surface of the second planar waveguide in lateral alignment with the second incoupling element, wherein the second optical element is configured to reflect image light in the second wavelength range.

5. The eyepiece of claim 4 wherein the second incoupling element is positioned laterally offset from the first incoupling element.

6. The eyepiece of claim 5 wherein the first optical element is further configured to reflect image light in the second wavelength range.

7. The eyepiece of claim 4 further comprising:
a third planar waveguide positioned in a third lateral plane adjacent the second lateral plane, wherein the third planar waveguide comprises a third incoupling element coupled thereto, and wherein the third incoupling element is configured to diffract image light in a third wavelength range centered at a third wavelength different from the first wavelength and the second wavelength.

8. The eyepiece of claim 7 wherein the second incoupling element is positioned in lateral alignment with the third incoupling element.

9. The eyepiece of claim 7 wherein the second optical element is configured to have a reflectance value at the second wavelength range that is greater than about 90%.

10. The eyepiece of claim 9 wherein the second optical element is further configured to have a transmittance value at the third wavelength range that is greater than about 90%.

11. The eyepiece of claim 9 further comprising:
a third optical element positioned in lateral alignment with the third incoupling element, wherein the third optical element is configured to reflect image light in the third wavelength range.

12. The eyepiece of claim 11 wherein the third optical element is further configured to reflect image light in the second wavelength range.

* * * * *